US010525553B2

(12) United States Patent
Sakamoto et al.

(10) Patent No.: US 10,525,553 B2
(45) Date of Patent: Jan. 7, 2020

(54) LASER MACHINING DEVICE AND LASER MACHINING METHOD

(71) Applicant: HAMAMATSU PHOTONICS K.K., Hamamatsu-shi, Shizuoka (JP)

(72) Inventors: Takeshi Sakamoto, Hamamatsu (JP); Yasunori Igasaki, Hamamatsu (JP); Mamiko Matsunaga, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 98 days.

(21) Appl. No.: 15/314,182

(22) PCT Filed: Mar. 30, 2015

(86) PCT No.: PCT/JP2015/060006
§ 371 (c)(1),
(2) Date: Nov. 28, 2016

(87) PCT Pub. No.: WO2015/182238
PCT Pub. Date: Dec. 3, 2015

(65) Prior Publication Data
US 2017/0216973 A1    Aug. 3, 2017

(30) Foreign Application Priority Data

May 29, 2014    (JP) ................. 2014-111321

(51) Int. Cl.
*B23K 26/53*       (2014.01)
*B23K 26/066*      (2014.01)
(Continued)

(52) U.S. Cl.
CPC .......... *B23K 26/53* (2015.10); *B23K 26/0006* (2013.01); *B23K 26/03* (2013.01);
(Continued)

(58) Field of Classification Search
CPC ........... B22K 2201/40; B23K 2203/50; B23K 2203/54; B23K 26/0006; B23K 26/0057;
(Continued)

(56) References Cited

U.S. PATENT DOCUMENTS

2003/0010763 A1    1/2003  Fukuchi et al.
2006/0151443 A1    7/2006  Fukuyo et al.

FOREIGN PATENT DOCUMENTS

CN    101772398       7/2010
JP    2004-322174 A   11/2004
(Continued)

OTHER PUBLICATIONS

Japanese to English machine translation of JP 2011-51011.*
International Preliminary Report on Patentability dated Dec. 8, 2016 for PCT/JP2015/060006.

*Primary Examiner* — Michael G Hoang
(74) *Attorney, Agent, or Firm* — Drinker Biddle & Reath LLP

(57) ABSTRACT

A laser processing device includes: a laser light source emitting laser light; a converging optical system converging the laser light at an object to be processed; a reflective spatial light modulator modulating the laser light such that the laser light is caused to branch into 0th order light and ±nth order light (n is a natural number) including at least first processing light and second processing light, and the first processing light is converged at a first converging point and the second processing light is converged at a second converging point; and a light blocking part blocking light to be converged at an outside with respect to the first processing light and the second processing light of the 0th order light and the ±nth order light to be converged at the object.

18 Claims, 24 Drawing Sheets

(51) Int. Cl.
 *B23K 26/03*   (2006.01)
 *B23K 26/046*  (2014.01)
 *B23K 26/08*   (2014.01)
 *B23K 26/067*  (2006.01)
 *C03B 33/02*   (2006.01)
 *B23K 26/00*   (2014.01)
 *B23K 101/40*  (2006.01)
 *B23K 103/00*  (2006.01)

(52) U.S. Cl.
 CPC .......... *B23K 26/046* (2013.01); *B23K 26/066* (2015.10); *B23K 26/067* (2013.01); *B23K 26/083* (2013.01); *C03B 33/0222* (2013.01); *B23K 2101/40* (2018.08); *B23K 2103/50* (2018.08); *B23K 2103/54* (2018.08)

(58) Field of Classification Search
 CPC ...... B23K 26/53; B23K 26/066; B23K 26/03; B23K 26/046; B23K 26/083; B23K 26/067; B23K 2101/40; B23K 2103/54; B23K 2103/50; C03B 33/0222
 USPC ............ 219/121.61, 121.67, 121.68, 121.72, 219/121.75, 121.76, 121.85
 See application file for complete search history.

(56) References Cited

FOREIGN PATENT DOCUMENTS

| | | |
|---|---|---|
| JP | 2004-337902 | 12/2004 |
| JP | 2004-337903 | 12/2004 |
| JP | 2006-068762 | 3/2006 |
| JP | 2008-170366 A | 7/2008 |
| JP | 2008-211210 | 9/2008 |
| JP | 2011-051011 A | 3/2011 |

* cited by examiner (a)

(b)

(a) NUMBER OF GRATING PIXELS: 4

(b) NUMBER OF GRATING PIXELS: 2

(a)

-3 -2 -1 0 +1 +2 +3 (ORDER)

(b)

(c)

-1ST ORDER LIGHT | 0TH ORDER LIGHT | +1ST ORDER LIGHT | +2ND ORDER LIGHT | +3RD ORDER LIGHT (d)

LASER MACHINING DEVICE AND LASER MACHINING METHOD

TECHNICAL FIELD

The present invention relates to a laser processing device and a laser processing method capable of converging laser light at an object to be processed so as to form a modified region within the object along a line to cut.

BACKGROUND ART

Conventionally, a laser processing method has been known that modulates laser light so that the laser light is caused to branch into a plurality of rays of processing light and each of the rays of processing light is converged at each of a plurality of converging points, and forms a modified region at each of a plurality of regions corresponding to each of the converging points in an object to be processed (for example, see Patent Literature 1).

CITATION LIST

Patent Literature

[Patent Literature 1] Japanese Unexamined Patent Publication No. 2011-051011

SUMMARY OF INVENTION

Technical Problem

Regarding an object to be processed provided with a plurality of functional devices on a front face of the object, there may be a case of setting a line to cut so that the line passes through a region between the functional devices adjacent to each other, causing the laser light to enter the object from a rear face, and forming a modified region within the object along the line. However, it has been found that, in such a case, when the laser processing method as mentioned above is performed, there is a possibility that damages occur in a region along the line at the front face as an opposite side to the laser light entrance side of the object (that is, the region between the functional devices adjacent to each other).

Therefore, it is an object of the present invention to provide a laser processing device and laser processing method capable of inhibiting damages from occurring at the front face as the opposite side to the laser light entrance side of the object when causing laser light to branch into a plurality of rays of processing light so as to form a modified region by each of the rays of processing light.

Solution to Problem

The laser processing device of one aspect of the present invention is a laser processing device for converging laser light at an object to be processed so as to form a modified region within the object along a line to cut, the laser processing device including a laser light source emitting the laser light, a converging optical system converging the laser light emitted from the laser light source at the object, a spatial light modulator modulating the laser light emitted from the laser light source such that the laser light is caused to branch into 0th order light and ±nth order light (n is a natural number) including at least first processing light and second processing light, and the first processing light is converged at a first converging point and the second processing light is converged at a second converging point by the converging optical system, and a light blocking part blocking light to be converged at an outside with respect to the first processing light and the second processing light of the 0th order light and the ±nth order light to be converged at the object; converging points of the 0th order light and the ±nth order light have a positional relationship in which the points are positioned at a first surface side as an opposite side to the laser light entrance side of the object and positioned at an anterior side in a relative moving direction of the laser light along the line, as a value indicating order increases or the value decreases, in the object.

In the laser processing device, the light is blocked that is converged at the outside with respect to the first processing light and the second processing light of the 0th order light and the ±nth order light to be converged at the object, so that the light is prevented from converging at the vicinity of the first surface of the object. Therefore, the laser processing device can inhibit the damages from occurring at the front face as the opposite side to the laser light entrance side of the object (that is, the first surface) when causing the laser light to branch into the plurality of rays of processing light so as to form the modified region with each of the rays of processing light. The processing light is light having energy capable of forming the modified region at a region corresponding to the converging point (the same applies hereinafter). The value indicating the order includes 0 and ±n (n is a natural number), and a + value represents that the value is larger as its absolute value increases, and a − value represents that the value is smaller as its absolute value increases (the same applies hereinafter).

The laser processing device of one aspect of the present invention is a laser processing device for converging laser light at an object to be processed so as to form a modified region within the object along a line to cut, the laser processing device including a laser light source emitting the laser light, a converging optical system converging the laser light emitted from the laser light source at the object, a spatial light modulator modulating the laser light emitted from the laser light source such that the laser light is caused to branch into 0th order light and ±nth order light (n is a natural number) including at least first processing light and second processing light, and the first processing light is converged at a first converging point and the second processing light is converged at a second converging point by the converging optical system, and a light blocking part blocking light to be converged at a first surface side as an opposite side to the laser light entrance side of the object with respect to the first processing light and the second processing light of the 0th order light and the ±nth order light to be converged at the object; converging points of the 0th order light and the ±nth order light have a positional relationship in which the points are positioned at the first surface side as the opposite side to the laser light entrance side of the object and positioned at an anterior side in a relative moving direction of the laser light along the line, as a value indicating order increases or the value decreases, in the object.

The laser processing device blocks the light to be converged at the first surface side of the object with respect to the first processing light and the second processing light of the 0th order light and the ±nth order light to be converged at the object, so that the light is prevented from converging at the vicinity of the first surface of the object. Therefore, the laser processing device can inhibit the damages from occurring at the front face as the opposite side to the laser light entrance side of the object (that is, the first surface) when causing the laser light to branch into the plurality of rays of processing light so as to form the modified region with each of the rays of processing light.

In the laser processing device of one aspect of the present invention, the light blocking part may further block light to be converged at a second surface side as the laser light entrance side of the object with respect to the first processing light and the second processing light of the 0th order light and the ±nth order light to be converged at the object. This makes it possible to inhibit the damages from occurring at the front face as the laser light entrance side of the object (that is, the second surface).

In the laser processing device of one aspect of the present invention, the first processing light and the second processing light may be selected from the 0th order light and ±1st order light of the 0th order light and the ±nth order light to be converged at the object, and the light blocking part may block +3rd order light of the ±nth order light to be converged at the object. This makes it possible to efficiently use the 0th order light and ±1st order light having relatively large energy as the first processing light and the second processing light. Meanwhile, the damages can be inhibited from occurring at the front face as the opposite side to the laser light entrance side of the object due to the +3rd order light having relatively large energy.

In the laser processing device of one aspect of the present invention, the light blocking part may further block ±2nd order light and −3rd order light of the ±nth order light to be converged at the object. This makes it possible to more reliably inhibit the damages from occurring at the front face as the opposite side to the laser light entrance side of the object, and the front face as the laser light entrance side of the object.

In the laser processing device of one aspect of the present invention, the light blocking part may have an aperture allowing the first processing light and the second processing light to pass therethrough. This makes it possible to achieve with a simple structure the light blocking part allowing at least the first processing light and the second processing light to pass therethrough and blocking predetermined light other than the first processing light and the second processing light.

The laser processing device of one aspect of the present invention may further includes an adjustment optical system having a first optical element and a second optical element each of which functions as a lens; the first optical element and the second optical element may be arranged such that a distance of an optical path between the spatial light modulator and the first optical element equals a first focal length of the first optical element, a distance of an optical path between the converging optical system and the second optical element equals a second focal length of the second optical element, a distance of an optical path between the first optical element and the second optical element equals a sum of the first focal length and the second focal length, and the first optical element and the second optical element constitute a double-telecentric optical system, and the light blocking part may be provided on a Fourier plane between the first optical element and the second optical element. This makes it possible to reliably block the predetermined light other than the first processing light and the second processing light.

In the laser processing device of one aspect of the present invention, the light blocking part may be provided at a light entrance part of the converging optical system. This makes it possible to reliably block the predetermined light other than the first processing light and the second processing light.

In the laser processing device of one aspect of the present invention, the spatial light modulator may modulate the laser light such that at least part of light to be blocked passes through an outside of the aperture. This makes it possible to more reliably block the predetermined light other than the first processing light and the second processing light.

In the laser processing device of one aspect of the present invention, the first surface may be provided with a plurality of functional devices two-dimensionally arranged, and a metal pattern arranged at a region between the functional devices adjacent to each other, and the line may be set so as to pass through the region between the functional devices adjacent to each other when viewed from a direction orthogonal to the first surface. When the metal pattern is arranged at the region between the functional devices adjacent to each other at the front face as the opposite side to the laser light entrance side of the object, the metal pattern absorbs the predetermined light other than the first processing light and the second processing light, and the damages easily occur at the front face. However, even in such a case, the damages can be inhibited from occurring at the front face as the opposite side to the laser light entrance side of the object.

The laser processing method of one aspect of the present invention is a laser processing method for converging laser light at an object to be processed so as to form a modified region within the object along a line to cut, the laser processing method including modulating the laser light such that the laser light is caused to branch into 0th order light and ±nth order light (n is a natural number) including at least first processing light and second processing light, and the first processing light is converged at a first converging point and the second processing light is converged at a second converging point, blocking light to be converged at an outside with respect to the first processing light and the second processing light of the 0th order light and the ±nth order light to be converged at the object, and forming the modified region at each of a plurality of regions corresponding to each of the first converging point and the second converging point in the object; converging points of the 0th order light and the ±nth order light have a positional relationship in which the points are positioned at a first surface side as an opposite side to the laser light entrance side of the object and positioned at an anterior side in a relative moving direction of the laser light along the line, as a value indicating order increases or the value decreases, in the object.

The laser processing method of one aspect of the present invention is a laser processing method for converging laser light at an object to be processed so as to form a modified region within the object along a line to cut, the laser processing method including modulating the laser light such that the laser light is caused to branch into 0th order light and ±nth order light (n is a natural number) including at least first processing light and second processing light, and the first processing light is converged at a first converging point and the second processing light is converged at a second converging point, blocking light to be converged at a first surface side as an opposite side to the laser light entrance side of the object with respect to the first processing light and the second processing light of the 0th order light and the ±nth order light to be converged at the object, and forming the modified region at each of a plurality of regions corresponding to each of the first converging point and the second converging point in the object; converging points of the 0th order light and the ±nth order light have a positional relationship in which the points are positioned at the first surface side as the opposite side to the laser light entrance side of the object and positioned at an anterior side in a relative moving direction of the laser light along the line, as a value indicating order increases or the value decreases, in the object.

For the same reason as the above-mentioned laser processing device, these laser processing methods can inhibit the damages from occurring at the front face as the opposite side to the laser light entrance side of the object (that is, the first surface) when causing the laser light to branch into the plurality of rays of processing light so as to form the modified region with each of the rays of processing light.

Advantageous Effects of Invention

According to the present invention, the laser processing device and laser processing method can be provided capable of inhibiting the damages from occurring at the front face as the opposite side to the laser light entrance side of the object when causing the laser light to branch into the plurality of rays of processing light so as to form the modified region with each of the rays of processing light.

DESCRIPTION OF EMBODIMENTS

Figure 1:
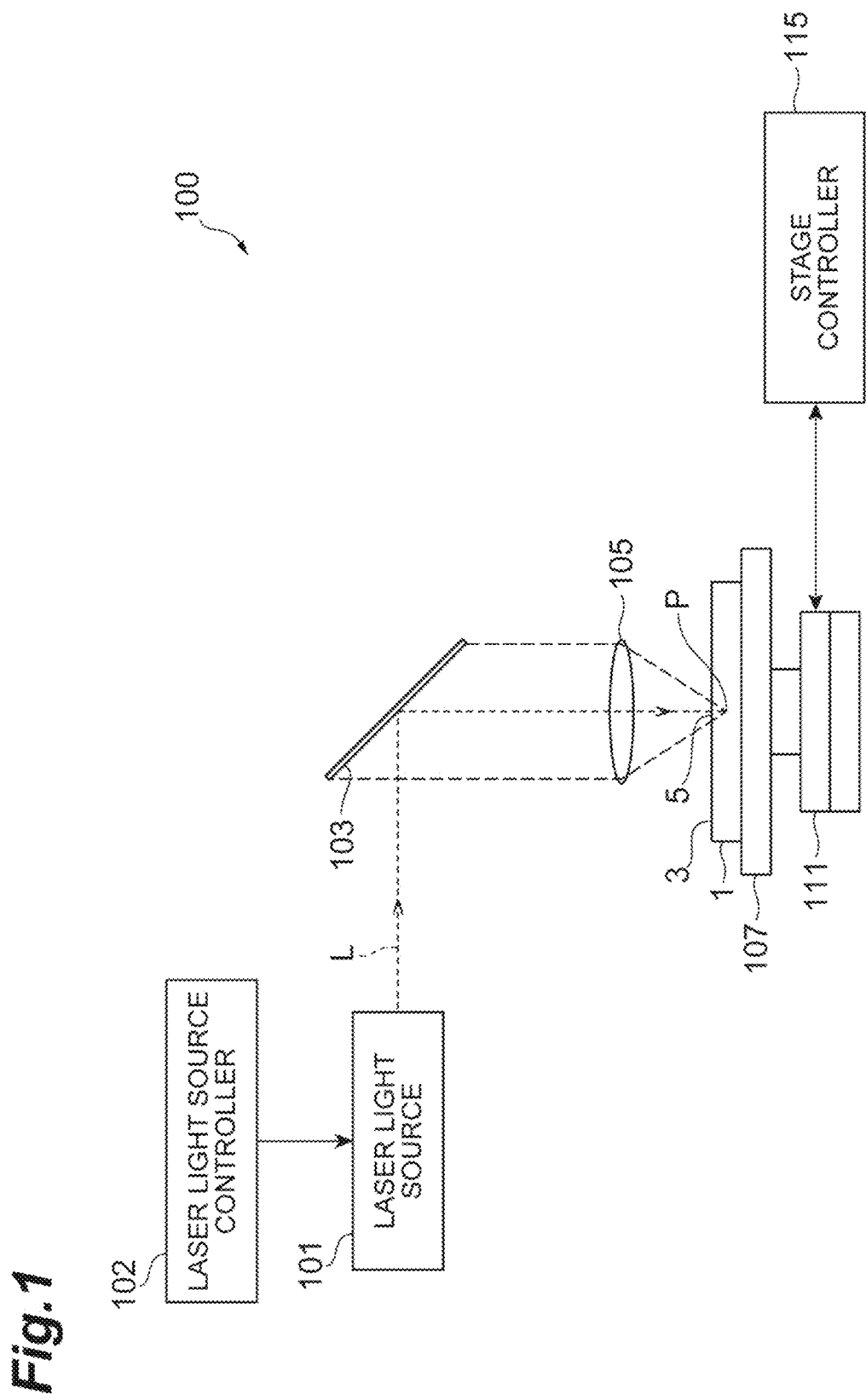
FIG. 1 is a schematic structural diagram of a laser processing device used for forming a modified region.

In the following, embodiments of the present invention will be explained in detail with reference to drawings. In the drawings, the same or equivalent parts will be denoted by the same reference signs, without redundant description.

A laser processing device and laser processing method of an embodiment of the present invention converge laser light at an object to be processed so as to form a modified region within the object along a line to cut. Therefore, the forming of the modified region will be explained at first with reference to FIGS. 1 to 6.

As illustrated in FIG. 1, a laser processing device 100 includes a laser light source 101 for causing laser light L to oscillate in a pulsating manner, a dichroic mirror 103 arranged to change a direction of the optical axis (optical path) of the laser light L by 90°, and a converging lens 105 for converging the laser light L. The laser processing device 100 further includes a support table 107 for supporting an object to be processed 1 which is irradiated with the laser light L converged by the converging lens 105, a stage 111 for moving the support table 107, a laser light source controller 102 for regulating the laser light source 101 in order to adjust the output, pulse width, pulse waveform, and the like of the laser light L, and a stage controller 115 for regulating the movement of the stage 111.

In the laser processing device 100, the laser light L emitted from the laser light source 101 changes the direction of its optical axis by 90° with the dichroic mirror 103 and then is converged by the converging lens 105 into the object 1 mounted on the support table 107. At the same time, the stage 111 is shifted, so that the object 1 moves relative to the laser light L along a line to cut 5. This forms a modified region in the object 1 along the line 5. While the stage 111 is shifted here for relatively moving the laser light L, the converging lens 105 may be shifted instead or together therewith.

Figure 2:
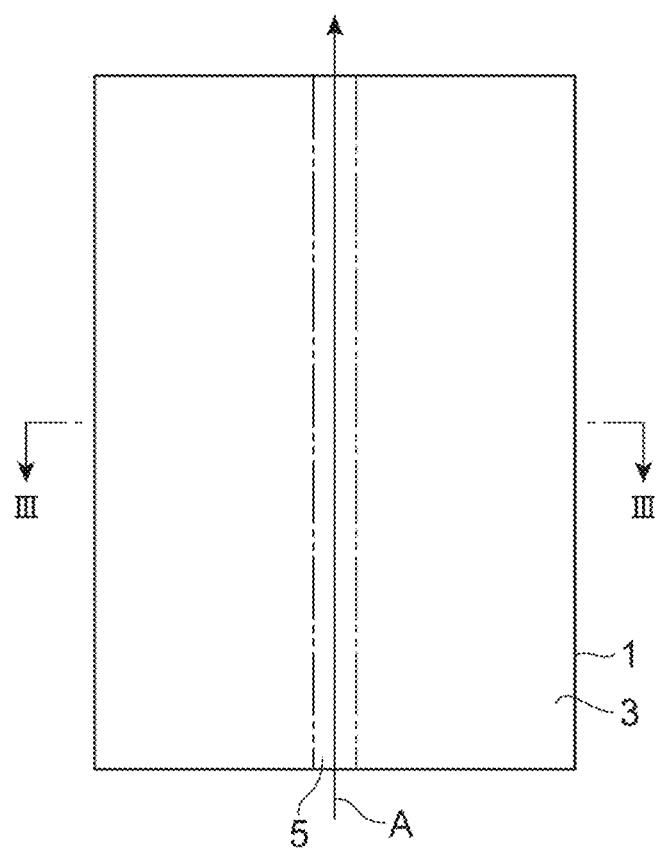
FIG. 2 is a plan view of an object to be processed for which the modified region is formed.
Figure 3:
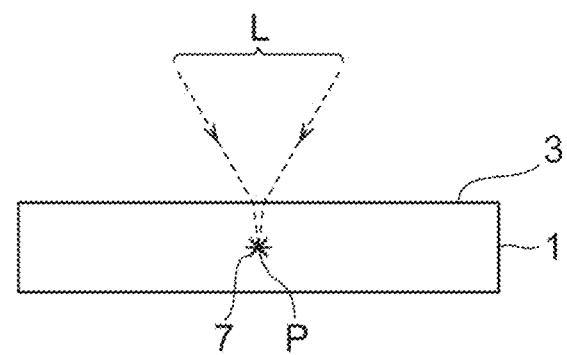
FIG. 3 is a sectional view of the object taken along the line III-III of FIG. 2.
Figure 4:
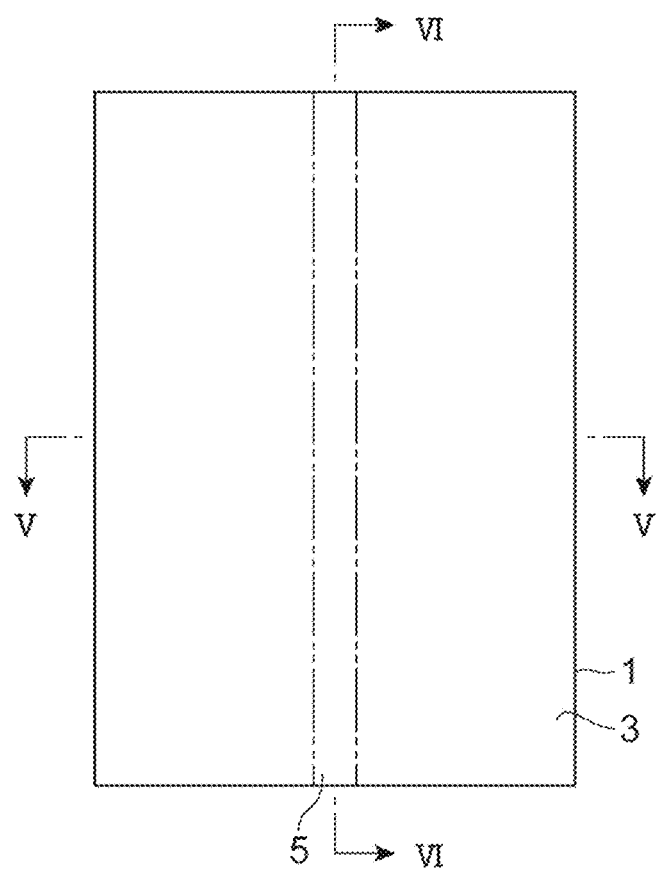
FIG. 4 is a plan view of the object after laser processing.
Figure 5:
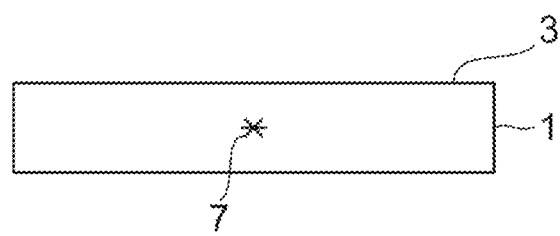
FIG. 5 is a sectional view of the object taken along the line V-V of FIG. 4.
Figure 6:
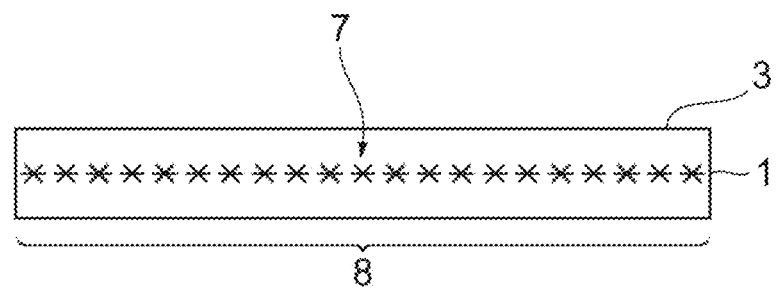
FIG. 6 is a sectional view of the object taken along the line VI-VI of FIG. 4.

Employed as the object 1 is a planar member (e. g., a substrate or a wafer), examples of which include semiconductor substrates formed of semiconductor materials and piezoelectric substrates formed of piezoelectric materials. As illustrated in FIG. 2, in the object 1, the line 5 is set for cutting the object 1. The line 5 is a virtual line extending straight. When forming a modified region within the object 1, the laser light L is relatively moved along the line 5 (i.e., in the direction of arrow A in FIG. 2) while locating a converging point (converging position) P within the object 1 as illustrated in FIG. 3. This forms a modified region 7 within the object 1 along the line 5 as illustrated in FIG. 4, FIG. 5 and FIG. 6, whereby the modified region 7 formed along the line 5 becomes a cutting start region 8.

The converging point P is a position at which the laser light L is converged. The line 5 may be curved instead of being straight, a three-dimensional one combining them, or one specified by coordinates. The line 5 may be one actually drawn on a front face 3 of the object 1 without being restricted to the virtual line. The modified region 7 may be formed either continuously or intermittently. The modified region 7 may be formed either in rows or dots and is only required to be formed at least within the object 1. There are cases where fractures are formed from the modified region 7 acting as a start point, and the fractures and modified region 7 may be exposed at outer surfaces (the front face 3, rear face 21, and outer peripheral surface) of the object 1. The laser light entrance surface for forming the modified region 7 is not limited to the front face 3 of the object 1 but may be the rear face 21 of the object 1.

Here, the laser light L is absorbed in particular in the vicinity of the converging point P within the object 1 while being transmitted therethrough, whereby the modified region 7 is formed in the object 1 (i.e., internal absorption type laser processing). Therefore, the front face 3 of the object 1 hardly absorbs the laser light L and thus does not melt. In the case of forming a removing part such as a hole or groove by melting it away from the front face 3 (surface absorption type laser processing), the processing region gradually progresses from the front face 3 side to the rear face side in general.

By the modified region 7 formed in this embodiment are meant regions of which physical characteristics such as density, refractive index, and mechanical strength have attained states different from those of their surroundings. Examples of the modified region 7 include molten processed regions (meaning at least one of regions resolidified after having being once molten, those in the molten state, and those in the process of resolidifying from the molten state), crack regions, dielectric breakdown regions, refractive index changed regions, and their mixed regions. Other examples of the modified region 7 include areas where the density of the modified region 7 has changed from that of an unmodified region and areas formed with a lattice defect in a material of the object 1 (which may also collectively be referred to as high-density transitional regions).

The molten processed regions, refractive index changed regions, areas where the modified region 7 has a density different from that of the unmodified region, or areas formed with a lattice defect may further incorporate a fracture (cut or microcrack) therewithin or at an interface between the modified region 7 and the unmodified region. The incorporated fracture may be formed over the whole surface of the modified region 7 or in only a part or a plurality of parts thereof. Examples of the object 1 include those containing or made of silicon (Si), glass, silicon carbide (SiC), $LiTaO_3$, and sapphire ($Al_2O_3$).

This embodiment forms a plurality of modified spots (processing scars) along the line 5, thereby producing the modified region 7. The modified spots, each of which is a modified part formed by a shot of one pulse of pulsed laser light (i.e., one pulse of laser irradiation; laser shot), gather to yield the modified region 7. Examples of the modified spots include crack spots, molten processed spots, refractive index changed spots, and those in which at least one of them is mixed. As for the modified spots, their size and lengths of fractures occurring therefrom can be controlled as necessary in view of the required cutting accuracy, the demanded flatness of cut surfaces, the thickness, kind, and crystal orientation of the object 1, and the like.

Figure 7:
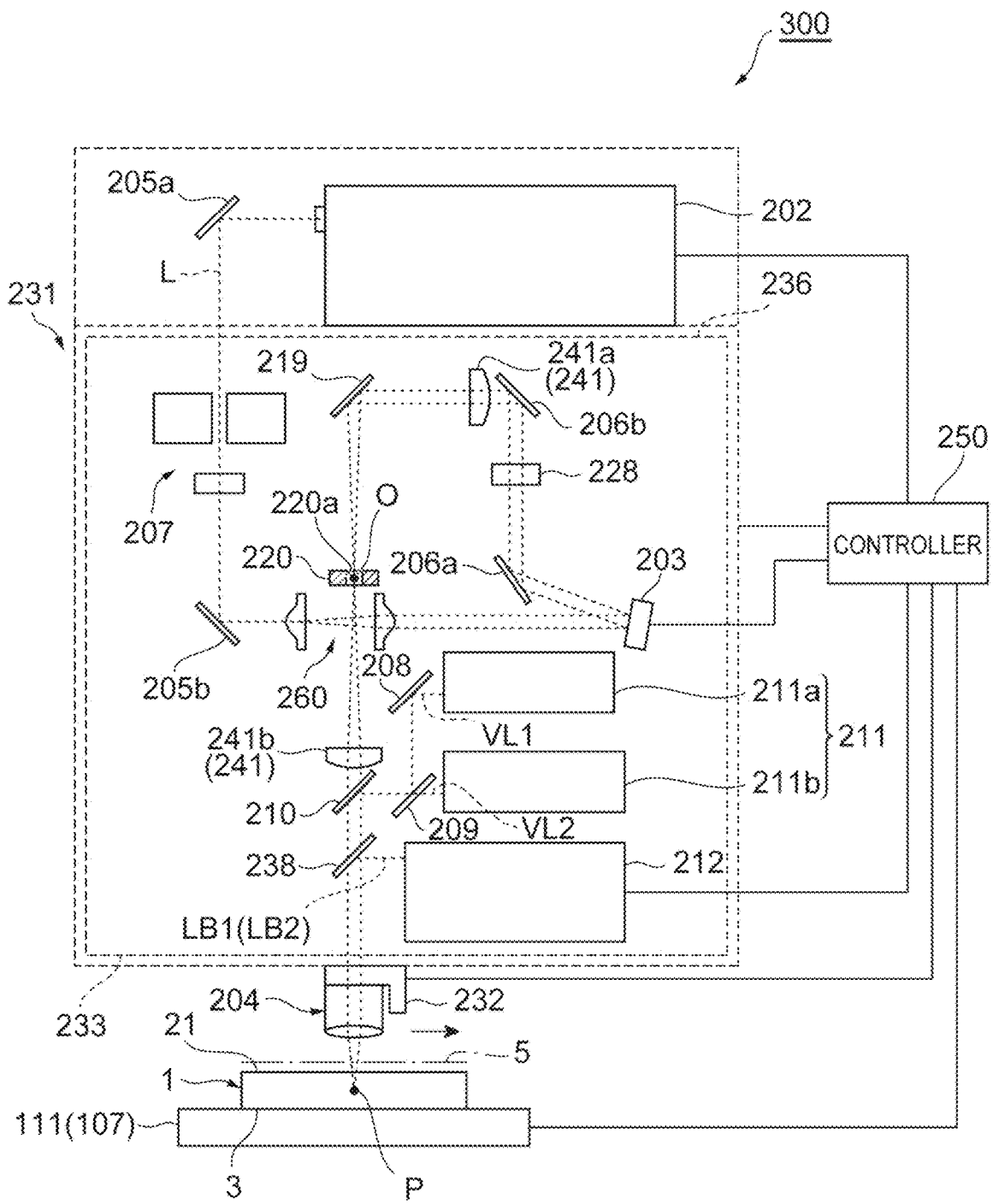
FIG. 7 is a schematic structural diagram of a laser processing device of an embodiment of the present invention.

Next, the laser processing device and laser processing method of the embodiment of the present invention will be explained. As illustrated in FIG. 7, a laser processing device 300 includes a laser light source 202, a reflective spatial light modulator (spatial light modulator) 203, a 4f optical system (adjustment optical system) 241, a light blocking part 220, and a converging optical system 204, within a housing 231. The laser processing device 300 converges the laser light L at the object 1 so as to form the modified region 7 within the object 1 along the line 5.

The laser light source 202 emits the laser light L having a wavelength of, for example, from 1000 nm to 1500 mu, and is a fiber laser, for example. Here, the laser light source 202 is secured to a top plate 236 of the housing 231 with a screw and the like so as to emit the laser light L horizontally.

The reflective spatial light modulator 203 modulates the laser light L emitted from the laser light source 202, and is a reflective liquid crystal (liquid crystal on silicon (LCOS)) spatial light modulator (SLM), for example. Here, the reflective spatial light modulator 203 modulates the laser light L horizontally incident thereon, while reflecting it obliquely upward with respect to the horizontal direction.

Figure 8:
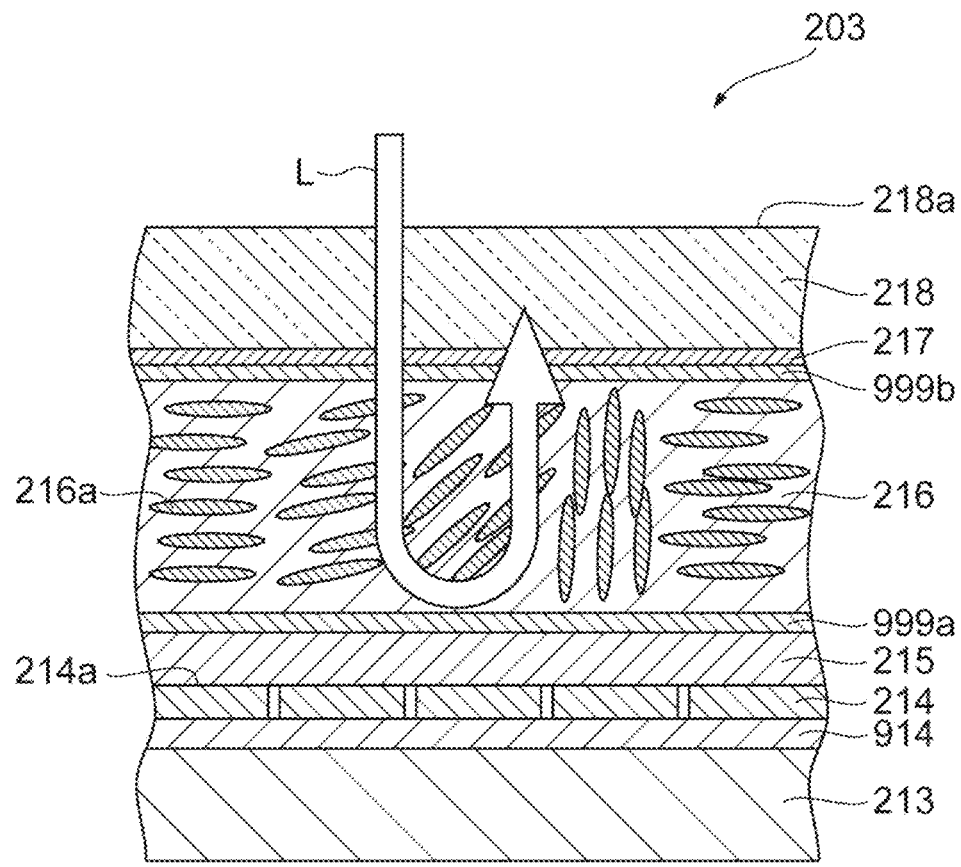
FIG. 8 is a partial sectional view of a reflective spatial light modulator of the laser processing device of FIG. 7.

As illustrated in FIG. 8, the reflective spatial light modulator 203 is constructed by a silicon substrate 213, a drive circuit layer 914, a plurality of pixel electrodes 214, a reflecting film 215 such as a dielectric multilayer mirror, an alignment film 999*a*, a liquid crystal layer 216, an alignment film 999*b*, a transparent conductive film 217, and a transparent substrate 218 such as a glass substrate, which are stacked in this order.

The transparent substrate 218 has a front face 218*a* extending along an XY plane, and the front face 218*a* constitutes a front face of the reflective spatial light modulator 203. The transparent substrate 218 is made of a light transmitting material such as glass, for example, and transmits therethrough the laser light L having a predetermined wavelength incident thereon from the front face 218*a* of the reflective spatial light modulator 203 to the inside of the reflective spatial light modulator 203. The transparent conductive film 217 is formed on a rear face of the transparent substrate 218, and includes a conductive material (e.g., ITO) which transmits therethrough the laser light L.

The plurality of pixel electrodes 214 is arranged in a matrix on the silicon substrate 213 along the transparent conductive film 217. Each pixel electrode 214 is made of a metal material such as aluminum, for example, while its front face 214*a* is processed flat and smooth. The plurality of pixel electrodes 214 are driven by an active matrix circuit provided in the drive circuit layer 914.

The active matrix circuit is provided between the plurality of pixel electrodes 214 and the silicon substrate 213, and controls an applied voltage to the pixel electrodes 214 according to a light image to be output from the reflective spatial light modulator 203. Such active matrix circuit has a first driver circuit for controlling the applied voltage for the pixel rows aligning in the X-axis direction, and a second driver circuit for controlling the applied voltage for pixel rows aligning in the Y-axis direction, which are not illustrated, for example, and is constructed so that a predetermined voltage is applied by the controller 250 (see FIG. 7) to the pixel electrodes 214 of a pixel specified by the driver circuits.

The alignment films 999*a*, 999*b* are arranged on both end faces of the liquid crystal layer 216, respectively, so as to align a group of liquid crystal molecules in a fixed direction. The alignment films 999*a*, 999*b* are made of a polymer material such as polyimide, of which surfaces coming into contact with the liquid crystal layer 216 are subjected to rubbing, and the like.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when a voltage is applied to the pixel electrodes 214 by the active matrix circuit of the drive circuit layer 914, an electric field is formed between the transparent conductive film 217 and the pixel electrodes 214, and alignment direction of liquid crystal molecules 216a changes according to a magnitude of the electric field formed in the liquid crystal layer 216. When the laser light L enters the liquid crystal layer 216 through the transparent substrate 218 and the transparent conductive film 217, the laser light L is modulated by the liquid crystal molecules 216a while passing through the liquid crystal layer 216, and reflected by the reflecting film 215, and then modulated again by the liquid crystal layer 216, and emitted.

At this time, the voltage applied to the pixel electrodes 214 is controlled by the controller 250 (see FIG. 7), and, according to the voltage, a refractive index changes in a part sandwiched between the transparent conductive film 217 and the pixel electrodes 214 in the liquid crystal layer 216 (the refractive index of the liquid crystal layer 216 at a position corresponding to each pixel changes). The change in the refractive index can alter the phase of the laser light L for each pixel of the liquid crystal layer 216 according to the voltage applied. That is, a phase modulation corresponding to a hologram pattern can be given by the liquid crystal layer 216 for each pixel (i.e., the liquid crystal layer 216 of the reflective spatial light modulator 203 can be caused to display a modulation pattern as a hologram pattern providing a modulation). As a result, the wavefront of the laser light L incident on and transmitted through the modulation pattern is adjusted, so that individual rays constituting the laser light L vary in phases of components in a predetermined direction orthogonal to their advancing direction. Therefore, the laser light L can be modulated (for example, intensity, amplitude, phase, and polarization of the laser light L can be modulated) by setting as necessary the modulation pattern to be displayed in the reflective spatial light modulator 203.

Returning to FIG. 7, the 4f optical system 241 adjusts a wavefront form of the laser light L modulated by the reflective spatial light modulator 203, and has a first lens (first optical element) 241a and a second lens (second optical element) 241b. The first lens 241a and the second lens 241b are arranged on an optical path between the reflective spatial light modulator 203 and the converging optical system 204 so that the distance of the optical path between the reflective spatial light modulator 203 and the first lens 241a equals a first focal length f1 of the first lens 241a, the distance of the optical path between the converging optical system 204 and the second lens 241b equals a second focal length f2 of the second lens 241b, the distance of the optical path between the first lens 241a and the second lens 241b equals a sum of the first focal length f1 and the second focal length f2 (that is, f1+f2), and the first lens 241a and the second lens 241b constitute a double-telecentric optical system. This 4f optical system 241 can inhibit the laser light L modulated by the reflective spatial light modulator 203 from changing its wavefront form through spatial propagation and thereby increasing an aberration.

The light blocking part 220 is an aperture member having an aperture 220a allowing first processing light L1 and second processing light L2 described later to pass therethrough. The light blocking part 220 is provided on a Fourier plane between the first lens 241a and the second lens 241b (that is, a plane including a confocal point O).

The converging optical system 204 converges the laser light L emitted from the laser light source 202 and modulated by the reflective spatial light modulator 203, into the object 1. The converging optical system 204, which includes a plurality of lenses, is placed on a bottom plate 233 of the housing 231 while interposing therebetween a drive unit 232 including a piezoelectric device and the like.

In the laser processing device 300 constructed as in the foregoing, the laser light L emitted from the laser light source 202 advances horizontally within the housing 231 and then is reflected downward by a mirror 205a, whereupon its light intensity is adjusted by an attenuator 207. Then, the laser light L is reflected horizontally by a mirror 205b and, with its intensity distribution homogenized by a beam homogenizer 260, enters the reflective spatial light modulator 203.

The laser light L having entered the reflective spatial light modulator 203 passes through the modulation pattern displayed in the liquid crystal layer 216, so as to be modulated according to the modulation pattern, then is reflected upward by a mirror 206a, changes its polarization direction with a half-wave plate 228, and is horizontally reflected by a mirror 206b, so as to enter the 4f optical system 241.

The laser light L having entered the 4f optical system 241 has its wavefront form adjusted so as to be incident as parallel light on the converging optical system 204. Specifically, the laser light L converges by passing through the first lens 241a, is reflected downward by a mirror 219, diverges at a confocal point O, and passes through the second lens 241b, so as to be converged again to become parallel light. Then, the laser light L passes through dichroic mirrors 210, 238 in sequence, so as to enter the converging optical system 204, thereby being converged into the object 1 mounted on the stage 111.

The laser processing device 300 also includes a surface observation unit 211 for observing the laser light entrance surface of the object 1, and an autofocus (AF) unit 212 for finely adjusting the distance between the converging optical system 204 and the object 1, within the housing 231.

The surface observation unit 211 has an observation light source 211a for emitting visible light VL1 and a detector 211b for receiving and detecting reflected light VL2 of the visible light VL1 reflected by the laser light entrance surface of the object 1. In the surface observation unit 211, the visible light VL1 emitted from the observation light source 211a is reflected by or transmitted through a mirror 208 and dichroic mirrors 209, 210, 238, so as to be converged by the converging optical system 204 to the object 1. The reflected light VL2 reflected by the laser light entrance surface of the object 1 is converged by the converging optical system 204, so as to be transmitted through or reflected by the dichroic mirrors 238, 210, and then transmitted through the dichroic mirror 209, so as to be received by the detector 211b.

The AF unit 212 emits AF laser light LB1 and receives and detects reflected light LB2 of the AF laser light LB1 reflected by the laser light entrance surface, thereby acquiring displacement data of the laser light entrance surface along the line 5. Then, when forming the modified region 7, the AF unit 212 drives the drive unit 232 according to thus obtained displacement data, so as to move the converging optical system 204 to and from in its optical axis direction along undulations of the laser light entrance surface of the object 1.

The laser processing device 300 further includes the controller 250 constituted by CPU, ROM, RAM, and the like, for controlling the laser processing device 300. The controller 250 controls the laser light source 202, so as to adjust the output, pulse width, and the like of the laser light L emitted from the laser light source 202. When forming the modified region 7, the controller 250 controls at least one of the positions of the housing 231 and stage 111 and the driving of the drive unit 232 so that the converging point P of the laser light L relatively moves along the line 5 while the converging point P of the laser light L is located at a predetermined distance from the rear face 21 or front face 3 of the object 1.

When forming the modified region 7, the controller 250 applies a predetermined voltage to the pixel electrodes 214 in the reflective spatial light modulator 203, so as to cause the liquid crystal layer 216 to display a predetermined modulation pattern, thereby enabling the reflective spatial light modulator 203 to modulate the laser light L as desired. Here, the modulation pattern displayed in the liquid crystal layer 216 is derived beforehand from the position to be formed with the modified region 7, the wavelength of the laser light L emitted, the material of the object 1, refractive indexes of the converging optical system 204 and object 1, and the like and stored in the controller 250. This modulation pattern includes an individual difference correction pattern for correcting individual differences occurring in the laser processing device 300 (e.g., distortions occurring in the liquid crystal layer 216 of the reflective spatial light modulator 203), a spherical aberration correction pattern for correcting a spherical aberration, and the like.

Figure 9:
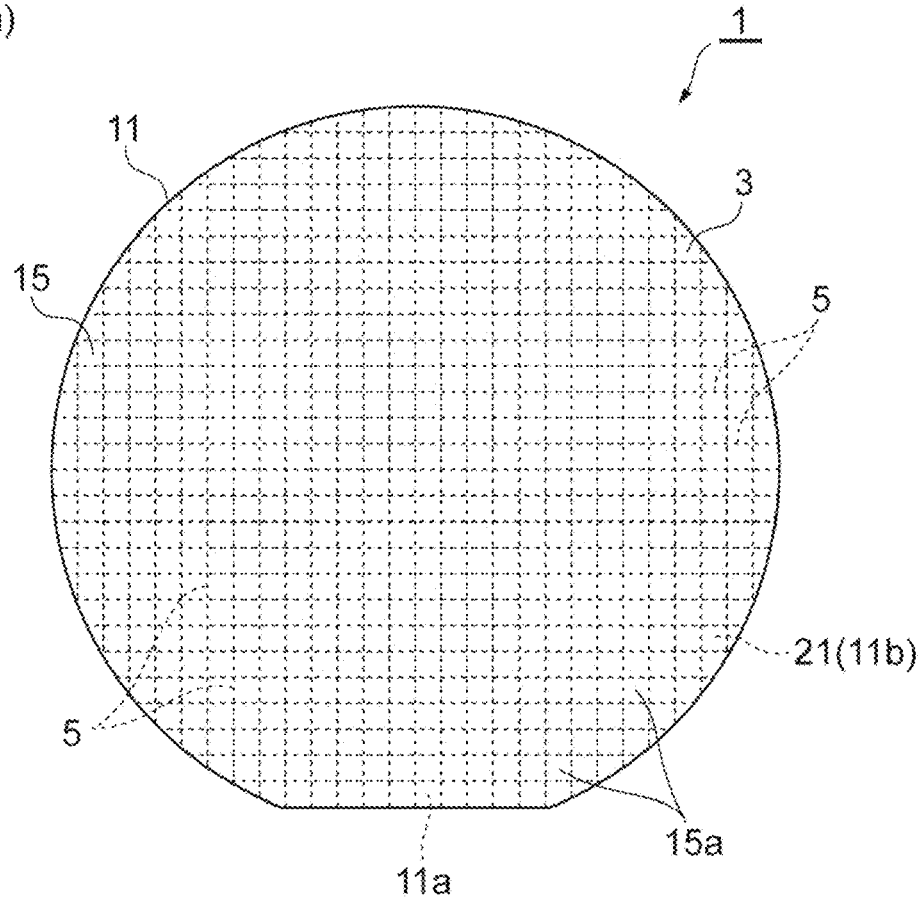
FIG. 9 illustrates (a) a plan view and (b) a partially enlarged sectional view of an object to be subjected to a laser processing method of an embodiment of the present invention.
Figure 9:
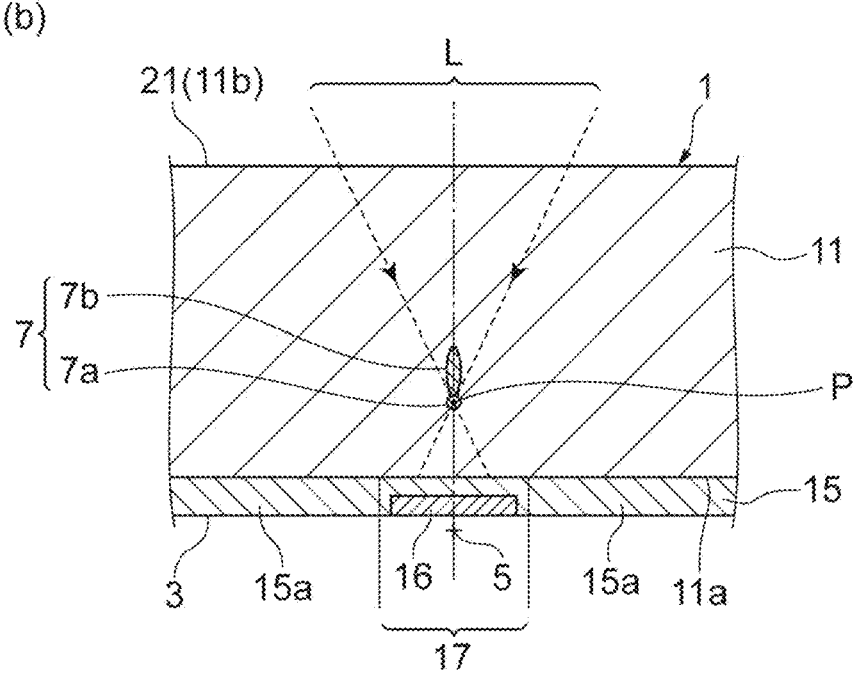

The object 1 to be subjected to the laser processing method to be performed in the laser processing device 300 constructed as in the foregoing, as illustrated in FIG. 9, includes a substrate 11 made of, for example, semiconductor material such as silicon, and a functional device layer 15 formed on a front face 11a of the substrate 11. The functional device layer 15 includes a plurality of functional devices 15a arranged in a matrix along the front face 11a of the substrate 11 (for example, light-receiving devices such as photo diodes, light-emitting devices such as laser diodes, or circuit devices formed as circuits), and a metal pattern 16 (for example, TEG (a test element group)) formed in a street region (region) 17 between the functional devices 15a adjacent to each other. In this way, the front face (first surface) 3 of the object 1 is provided with the plurality of functional devices 15a two-dimensionally arranged, and the metal pattern 16 arranged at the street region 17 between the functional devices 15a adjacent to each other. The functional device layer 15 includes an interlayer insulating layer (for example, Low-k film) formed over the entire front face 11a of the substrate 11.

The laser processing method to be performed in the laser processing device 300 is used as a chip manufacturing method for manufacturing a plurality of chips by cutting the object 1 for each of the functional devices 15a. For that reason, in the laser processing method, the plurality of lines 5 is set in a grid so as to pass through the street region 17 between the functional devices 15a adjacent to each other when viewed from a direction orthogonal to the front face 3 (for example, to pass through the center of the width of the street region 17 when viewed from the thickness direction of the object 1), for the object 1. The laser light L entered from the rear face (second surface) 21 of the object 1, the rear face 21 being a rear face 11b of the substrate 11, is converged at the object 1, and the modified region 7 is formed within the object 1 along each of the lines 5. Incidentally, in the substrate 11 made of the semiconductor material such as silicon, there may be a case in which a microcavity 7a is formed at a position of the converging point P of the laser light L and the molten processed region 7b is formed at a laser light L entrance side with respect to the converging point P, as the modified region 7.

Figure 10:
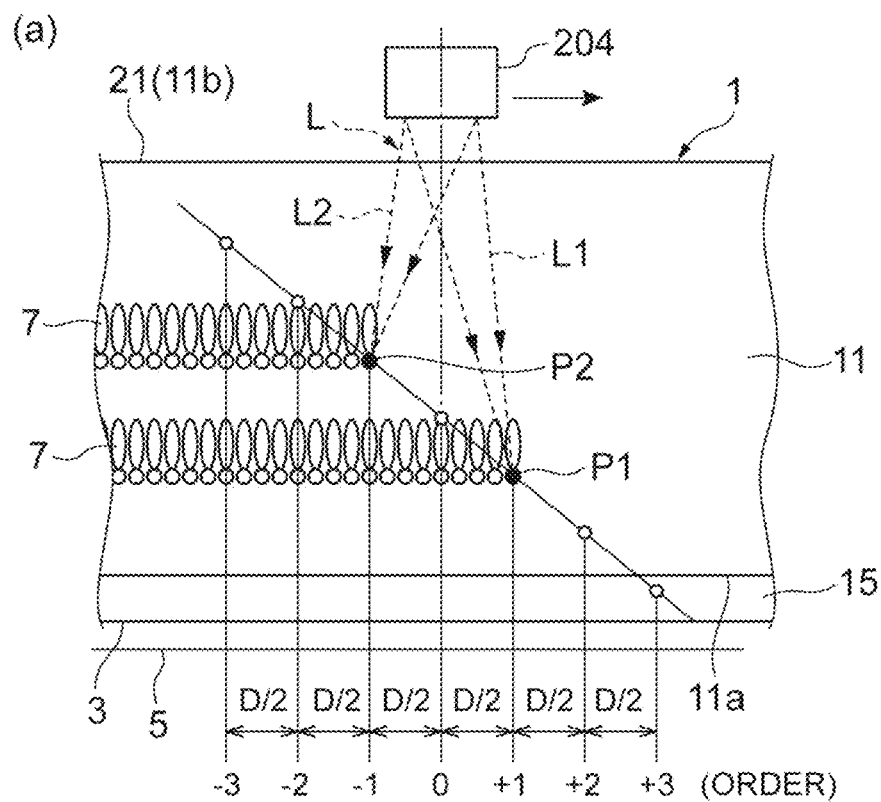
FIG. 10 is a sectional view of the object for explaining the laser processing method of the embodiment of the present invention.
Figure 10:
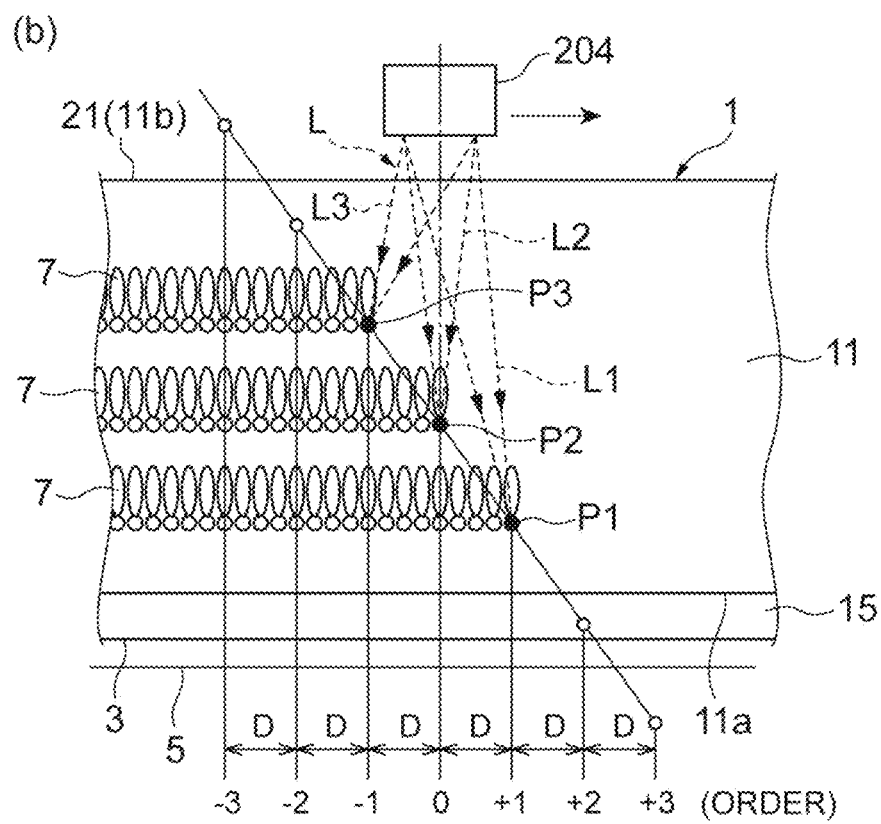

In the following, the laser processing method to be performed in the laser processing device 300 will be explained. First, the liquid crystal layer 216 of the reflective spatial light modulator 203 is caused to display the modulation pattern including a diffraction function for causing the laser light L to branch into the 0th order light and ±nth order light (n is a natural number) in a direction along the line 5. In this way, in the reflective spatial light modulator 203, the liquid crystal layer 216 functions as the plurality of pixels for displaying the modulation pattern. As illustrated in FIG. 10, converging points of the 0th order light and ±nth order light have a positional relationship in which the points are positioned at the front face 3 side as the opposite side to the laser light L entrance side of the object 1 and positioned at an anterior side in a relative moving direction of the laser light L along the line 5, as a value indicating order (which includes 0 and ±n, and a + value represents that the value is larger as its absolute value increases, and a − value represents that the value is smaller as its absolute value increases) increases in the object 1.

In the laser processing method, as illustrated in FIG. 10(a), +1st order light and −1st order light are respectively used as the first processing light L1 and the second processing light L2 (processing light: light having energy capable of forming the modified region at a region corresponding to the converging point). Thus, the first converging point P1 and the second converging point P2 have a positional relationship in which the first converging point P1 is positioned at the front face 3 side as the opposite side to the laser light L entrance side of the object 1 with respect to the second converging point P2, and the first converging point P1 is positioned at the anterior side in the relative moving direction of the laser light L along the line 5 with respect to the second converging point P2, in the object 1.

Incidentally, as illustrated in FIG. 10(b), the +1st order light, 0th order light, and −1 sorder light may be respectively used as the first processing light L1, second processing light L2, and third processing light L3. That is, the first processing light L1 and second processing light L2 are selected from the 0th order light and ±1st order light of the 0th order light and ±nth order light to be converged at the object 1.

As described above, the reflective spatial light modulator 203 modulates the laser light L emitted from the laser light source 202 so that the laser light L is caused to branch into the 0th order light and ±nth order light including at least the first processing light L1 and second processing light L2, and the first processing light L1 is converged at the first converging point P1 and the second processing light L2 is converged at the second converging point P2 by the converging optical system 204.

Figure 11:
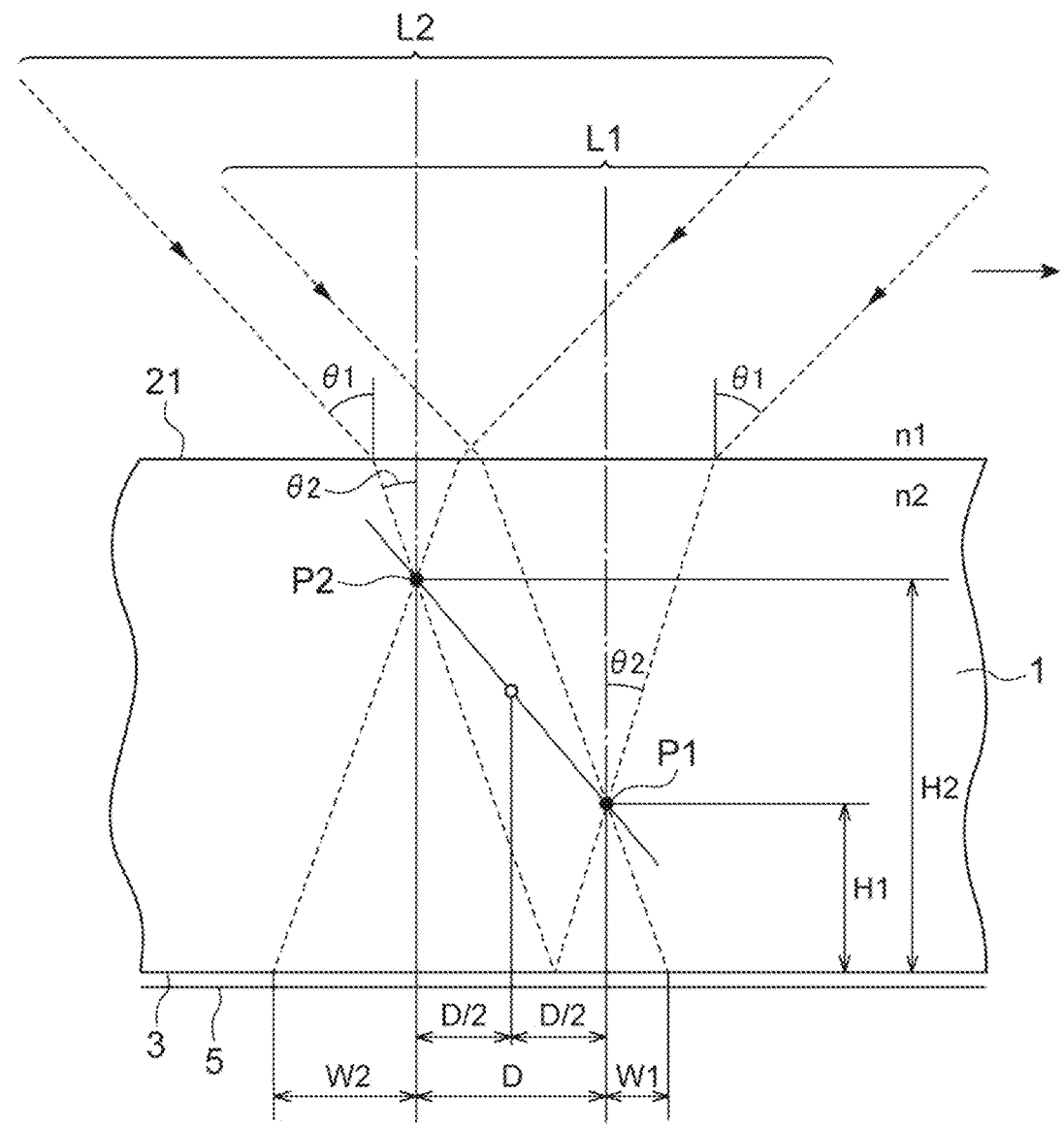
FIG. 11 is a sectional view of the object for explaining the laser processing method of the embodiment of the present invention.

Here, a distance is defined as D between the first converging point P1 and the second converging point P2 when viewed from a direction orthogonal to the front face 3 of the object 1 (a distance between processing light converging points adjacent to each other in the direction along the line 5 when viewed from the direction orthogonal to the front face 3 of the object 1). Then, as illustrated in FIG. 11, in a case in which a radius is W1 of the first processing light L1 at the front face 3 and a radius is W2 of the second processing light L2 at the front face 3, the reflective spatial light modulator 203 modulates the laser light L so that D>W1+W2 is satisfied. This prevents leakage light of the first processing light L1 (light not being absorbed by the object in the region corresponding to the converging point) and leakage light of the second processing light L2 reaching the front face 3 of the object 1 from interfering with and enhancing each other at the front face 3.

As an example, when a silicon wafer of a thickness of 300 μm, a crystal orientation of (100), and a resistance value of 1 Ω·cm UP is prepared as the object 1, and the laser light L is emitted under the conditions shown in FIG. 11 and Table 1 below, the distance D(=W1+W2) between the first converging point P1 and the second converging point P2 is 31.32641 μm when the leakage light of the first processing light L1 and the leakage light of the second processing light L2 are in contact with each other at the front face 3 as the opposite side to the laser light L entrance side of the object 1. A scan speed of the laser light L is a relative moving speed of the first converging point P1 and second converging point P2 along the line 5.

TABLE 1

|  | Value | Formula |
|---|---|---|
| Wavelength of Laser Light L (nm) | 1080 | |
| Repetition Frequency of Laser Light L (kHz) | 80 | |
| Pulse Width of Laser Light L (ns) | 500 | |
| Scan Speed of Laser Light L (mm/S) | 300 | |
| Exit Output of Laser Light L (W) | 3.2 | |
| Number of Branches of Laser Light L | 2 | |
| Branching Ratio of Laser Light L | 50:50 | |
| Distance H1 Between Front Face 3 and First Converging Point P1 (μm) | 46 | |
| Distance H2 Between Front Face 3 and Second Converging Point P2 (μm) | 96 | |
| Numerical Aperture Na of First Processing Light L1 and Second Processing Light L2 | 0.754 | |
| Refractive Index n1 of Ambient Atmosphere | 1 | |
| Refractive Index n2 of Object 1 | 3.5 | |
| Radius W1 of First Processing Light L1 at Front Face 3 (μm) | 10.14799 | W1 = H1 × tanθ2<br>θ2 = asin(n1 × sinθ1/n2)<br>θ1 = asin(NA/n1) |
| Radius W1 of First Processing Light L1 at Front Face 3 (μm) | 21.17842 | W2 = H2 × tanθ2<br>θ2 = asin(n1 × sinθ1/n2)<br>θ1 = asin(NA/n1) |

A result of an experiment is obtained as shown in Table 2, and damages occur at the front face 3 when the distance D is 30 μm or less between the first converging point P1 and the second converging point P2 (the distance D is less than 31.32641 μm), and the damages do not occur at the front face 3 when the distance D is 40 μm or more between the first converging point P1 and the second converging point P2 (the distance D is greater than 31.32641 μm). From this result, it has been found that modulating the laser light L so that D>W1+W2, prevents the leakage light of the first processing light L1 and leakage light of the second processing light L2 reaching the front face 3 of the object 1 from interfering with and enhancing each other at the front face 3, and inhibits the damages from occurring at the front face 3.

TABLE 2

| Distance D (μm) | 20 | 30 | 40 | 50 | 60 |
|---|---|---|---|---|---|
| Damage at Front Face 3 | Occur | Occur | Not Occur | Not Occur | Not Occur |

Figure 12:
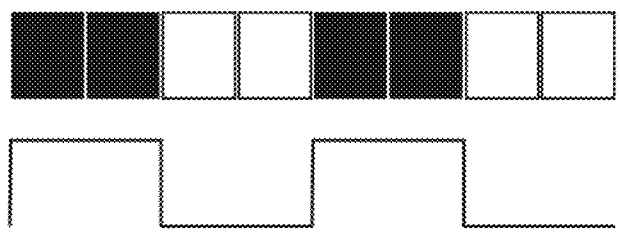
FIG. 12 is a diagram for explaining the number of grating pixels in the reflective spatial light modulator of FIG. 8.
Figure 12:
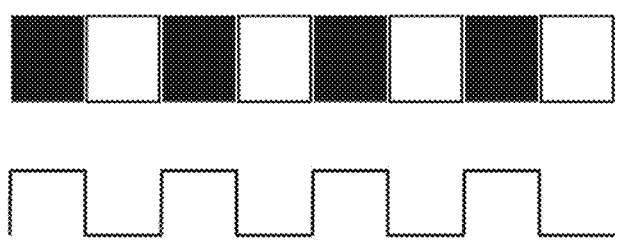

In the liquid crystal layer 216 functioning as the plurality of pixels for displaying the modulate pattern, in a case in which a distance is d between the pixels adjacent to each other, magnification is m of the 4f optical system 241, a focal length is f of the converging optical system 204, and a wavelength is λ of the laser light L, the reflective spatial light modulator 203 modulates the laser light L so that D<2×f×tan [a sin {λ/(d×4×m)}] is satisfied. In the above-described formula, "4" represents the number of grating pixels in the modulation pattern of the reflective spatial light modulator 203, and the number of grating pixels: 4 is a case of FIG. 12(*a*). As a reference, the number of grating pixels: 2 is a case of FIG. 12(*b*).

In order to increase the above-mentioned distance D between the first converging point P1 and the second converging point P2, it is necessary to decrease the number of grating pixels in the modulation pattern of the reflective spatial light modulator 203. However, when the number of grating pixels is excessively decreased, there is a possibility that the leakage light is increased due to the increase of components to which wavefront control cannot be performed in the laser light L. Therefore, a silicon wafer of a thickness of 300 μm, a crystal orientation of (100), a resistance value of 1 Ω·cm UP is prepared as the object 1, and irradiation of the laser light L is performed under the conditions shown in FIG. 11 and Table 3 below, to examine a relationship between the number of grating pixels and presence of occurrence of the damages at the front face 3. The distance D between the first converging point P1 and the second converging point P2 can be calculated by D=2×f×tan [a sin {λ/(d×number of grating pixels×m)}].

TABLE 3

|  | VALUE |
|---|---|
| Wavelength Λ of Laser Light L (nm) | 1080 |
| Repetition Frequency of Laser Light L (kHz) | 80 |
| Pulse Width of Laser Light L (ns) | 500 |
| Scan Speed of Laser Light L (mm/s) | 300 |
| Exit Output Laser Light L (W) | 3.2 |
| Number of Branches of Laser Light L | 2 |
| Branching Ratio of Laser Light L | 50:50 |
| Distance H1 Between Front Face 3 and First Converging Point P1 (μm) | 46 |
| Distance H2 Between Front Face 3 and Second | 96 |

TABLE 3-continued

| | VALUE |
|---|---|
| Converging Point P2 (μm) | |
| Numerical Aperture of First Processing Light L1 and Second Processing Light L2 | 0.754 |
| Refractive Index n1 of Ambient Atmosphere | 1 |
| Refractive Index n2 of Object 1 | 3.5 |
| Distance d Between Pixels Adjacent to Each Other (μm) | 20 |
| Magnification m of 4f Optical System 241 | 0.485437 |
| Focal Length f of Converging Optical System 204 (mm) | 1.83 |

A result of an experiment is obtained as shown in Table 4, and damages occur at the front face 3 when the number of grating pixels is 4 or less (in other words, when the distance D is 102 μm or more between the first converging point P1 and the second converging point P2), and the damages do not occur at the front face 3 when the number of grating pixels is 5 or more (in other words, when the distance D is 80 μm or less between the first converging point P1 and the second converging point P2). From this result, it has been found that modulating the laser light L so that $D<2\times f\times \tan[a\sin\{\lambda/(d\times 4\times m)\}]$ is satisfied, inhibits the leakage light from being increased due to the increase of the components to which the wavefront control cannot be performed in the laser light L, and inhibits the damages from occurring at the front face 3.

TABLE 4

| | Number of Grating Pixels | | | | |
|---|---|---|---|---|---|
| | 2 | 3 | 4 | 5 | 6 |
| Distance D (μm) | 204 | 136 | 102 | 80 | 66 |
| Damage at Front Face 3 | Occur | Occur | Occur | Not Occur | Not Occur |

Figure 13:
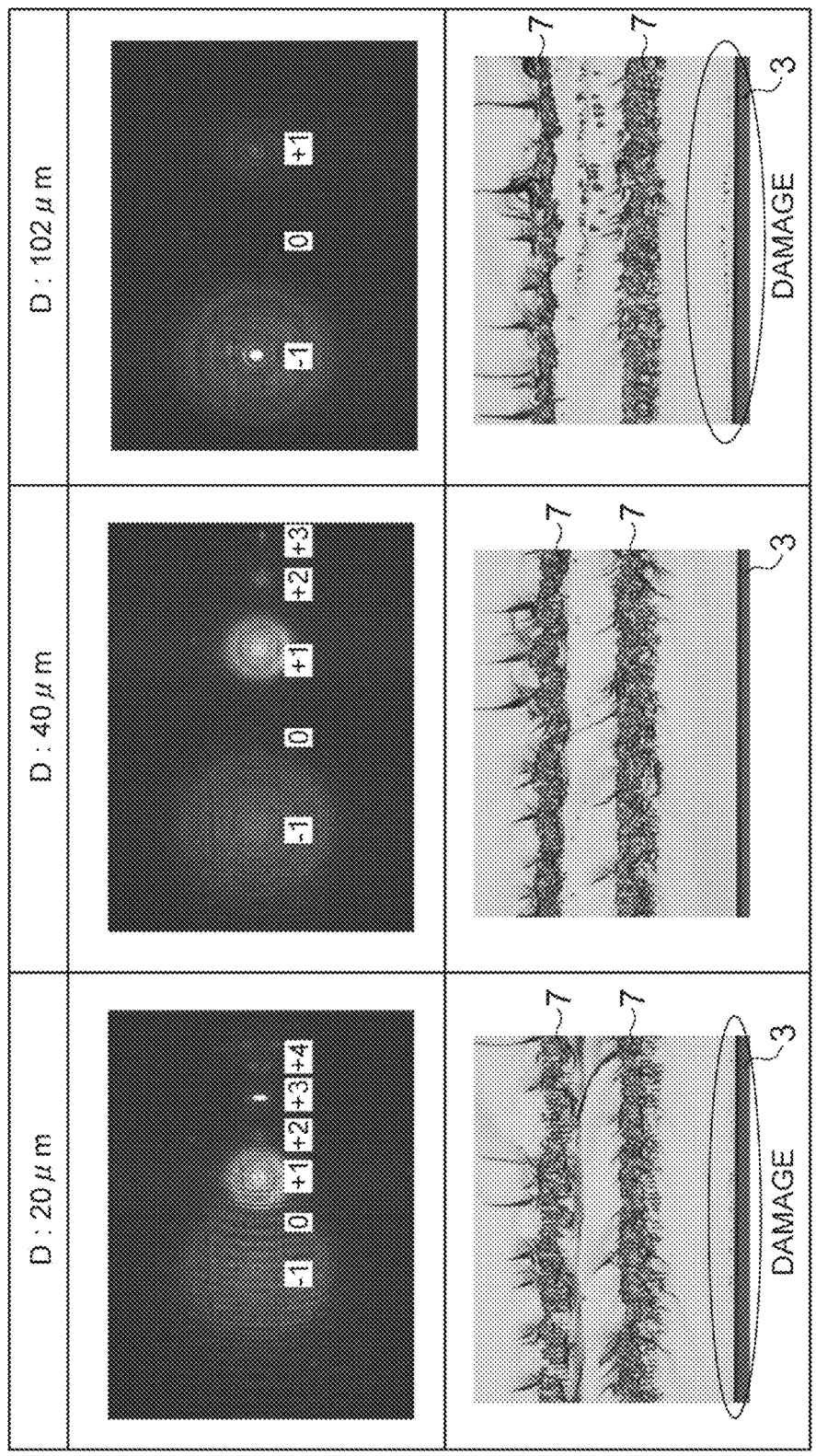
FIG. 13 is a diagram for explaining experimental results relating to the present invention.

Further, from the results of Table 2 and Table 4, it has been found that modulating the laser light L so that the distance is from 40 μm to 80 μm between the first converging point P1 and the second converging point P2, inhibits the damages from occurring at the front face 3. As illustrated in FIG. 13, when the distance D is 20 μm between the first converging point P1 and the second converging point P2, it is recognized that the leakage light of the first processing light L1 and the leakage light of the second processing light L2 reaching the front face 3 of the object 1 interfere with and enhance each other at the front face 3 (upper part), and the damages occur at the front face 3 (lower part). When the distance D is 102 μm between the first converging point P1 and the second converging point P2, it is recognized that the leakage light is increased in the −1st order light (upper part), and the damages occur at the front face 3 (lower part). In contrast with these, when the distance D is 40 μm between the first converging point P1 and the second converging point P2, it is not recognized that the leakage light of the first processing light L1 and the leakage light of the second processing light L2 reaching the front face 3 of the object 1 interfere with and enhance each other at the front face 3 and the leakage light is increased in the −1st order light (upper part), and the damages do not occur at the front face 3 (lower part). The diagrams in the upper part of FIG. 13 are photographs of states of the 0th order light and ±nth order light at the front face 3 observed from the front face 3 side when the modified region has not been formed. The diagrams in the lower part of FIG. 13 are photographs of cut surfaces of the object 1 cut along the line 5.

The light blocking part 220 blocks ±2nd order light and higher order light of the ±nth order light to be converged at the object 1 (here, ±2nd order light and ±3rd order light). From this, it can be said that the light blocking part 220 blocks light to be converged at the outside with respect to the first processing light L1 and second processing light L2 of the 0th order light and ±nth order light to be converged at the object 1. Alternatively, it can be said that the light blocking part 220 blocks light to be converged at the front face 3 side as the opposite side to the laser light L entrance side of the object with respect to the first processing light L1 and second processing light L2 of the 0th order light and ±nth order light to be converged at the object 1, and light to be converged at the rear face 21 side as the laser light L entrance side of the object with respect to the first processing light L1 and second processing light L2. Incidentally, the reflective spatial light modulator 203 may modulate the laser light L so that at least part of the light to be blocked passes through the outside of the aperture 220*a* of the light blocking part 220.

Figure 14:
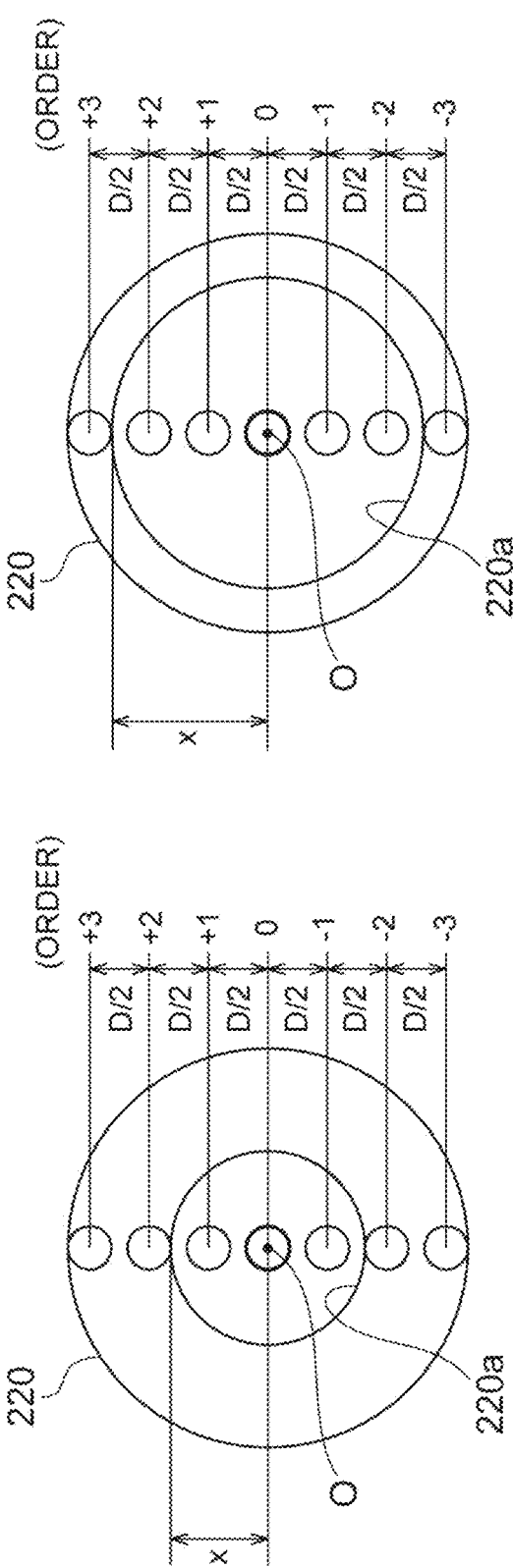
FIG. 14 is a diagram for explaining a light blocking part used for the laser processing device of FIG. 7.

In a case in which a radius is X of the aperture 220*a* of the light blocking part 220 positioned on a Fourier plane of the 4f optical system 241 as illustrated in FIG. 14(*a*), and the distance is D between the first converging point P1 and the second converging point P2 when viewed from the direction orthogonal to the front face 3 of the object 1, f2 is the second focal length of the second lens 241*b*, and f is the focal length of the converging optical system 204 as described above, it is necessary to satisfy $D\times f2/f<2X<2D\times f2/f$ in order to block the ±2nd order light and higher order light (outer part than the center for the ±2nd order light) with the light blocking part 220. That is, when the reflective spatial light modulator 203 modulates the laser light L so that $(X\times f)/(2\times f2)<D/2<(X\times f)/f2$ is satisfied, the light blocking part 220 can block the ±2nd order light and higher order light (outer part than the center for the ±2nd order light).

As illustrated in FIG. 14(*b*), it is necessary to satisfy $D\times f2/f<2X<3D\times f2/f$ in order to block the ±3rd order light and higher order light (outer part than the center for the ±3rd order light) with the light blocking part 220. That is, when the reflective spatial light modulator 203 modulates the laser light L so that $(X\times f)/(3\times f2)<D/2<(X\times f)/f2$ is satisfied, the light blocking part 220 can block the ±3rd order light and higher order light (outer part than the center for the ±3rd order light).

As an example, in a case in which D=50 μm, f2=150 mm, and f=1.8 mm, when the radius X of the aperture 220*a* of the light blocking part 220 is determined so as to satisfy 4166.7 μm<2X<8333 μm, the light blocking part 220 can block the ±2nd order light and higher order light (outer part than the center for the ±2nd order light). In other words, in a case in which 2X=10000 μm, f2=150 mm, and f=1.8 mm, when the distance D between the first converging point P1 and the second converging point P2 is determined so as to satisfy 30 μm<D/2<60 μm, the light blocking part 220 can block the ±2nd order light and higher order light (outer part than the center for the ±2nd order light).

In a case in which D=50 μm, f2=150 mm, and f=1.8 mm, when the radius X of the aperture 220*a* of the light blocking part 220 is determined so as to satisfy 4166.7 μm<2X<12500 μm, the light blocking part 220 can block the ±3rd order light and higher order light (outer part than the center for the ±3rd order light). In other words, in a case in which 2X=10000 μm, f2=150 mm, and f=1.8 mm, when the distance D between the first converging point P1 and the second converging point P2 is determined so as to satisfy 20 μm<D/2<60 μm, the light blocking part 220 can block the ±3rd order light and higher order light (outer part than the center for the ±3rd order light).

Figure 15:
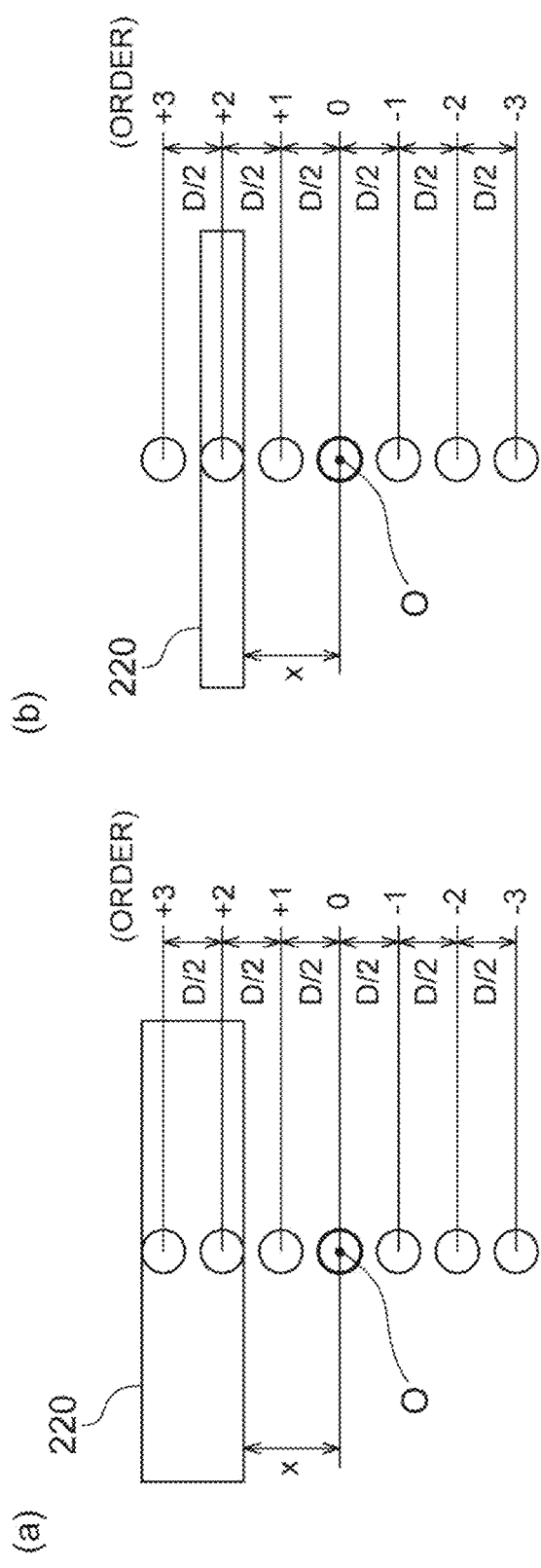
FIG. 15 is a diagram for explaining the light blocking part used for the laser processing device of FIG. 7.

Incidentally, in order to inhibit the damages from occurring at the front face 3 as the opposite side to the laser light L entrance side of the object 1, the light blocking part 220 may be a member blocking the ±nth order light. In that case, as illustrated in FIG. 15(a), in a case in which a distance is X from the confocal point O to the light blocking part 220 (an edge of a confocal point O side of the light blocking part 220) on the Fourier plane of the 4f optical system 241, it is necessary to satisfy D×f2/f<2X<2D×f2/f in order to block +2nd order light and higher order light (outer part than the center for the +2nd order light) with the light blocking part 220. That is, when the reflective spatial light modulator 203 modulates the laser light L so that (X×f)/(2×f2)<D/2<(X×f)/f2 is satisfied, the light blocking part 220 can block the +2nd order light and higher order light (outer part than the center for the +2nd order light).

As illustrated in FIG. 15(b), it is necessary to satisfy D×f2/f<2X<3D×f2/f in order to block the +3rd order light and higher order light (outer part than the center for the +3rd order light) with the light blocking part 220. That is, when the reflective spatial light modulator 203 modulates the laser light L so that (X×f)/(3×f2)<D/2<(X×f)/f2 is satisfied, the light blocking part 220 can block the +3rd order light and higher order light (outer part than the center for the +3rd order light).

Figure 16:
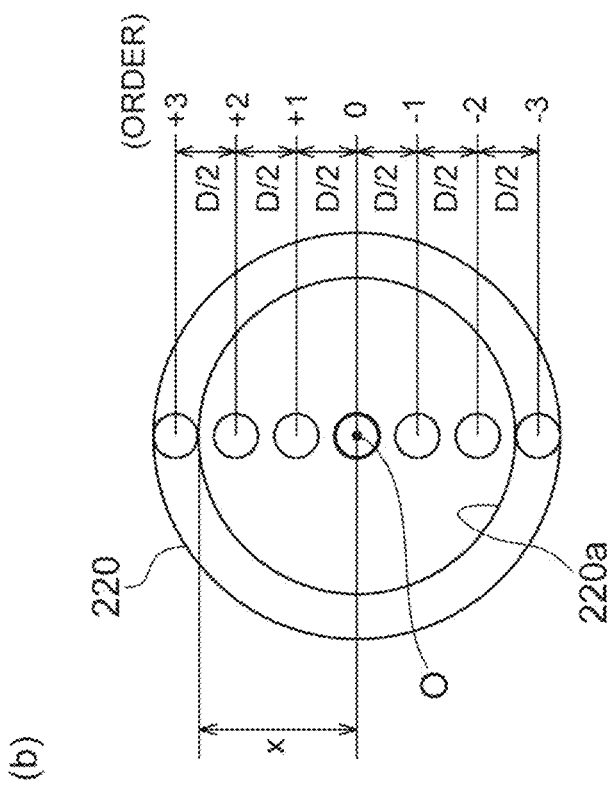
FIG. 16 is a diagram for explaining the light blocking part used for the laser processing device of FIG. 7.
Figure 16:
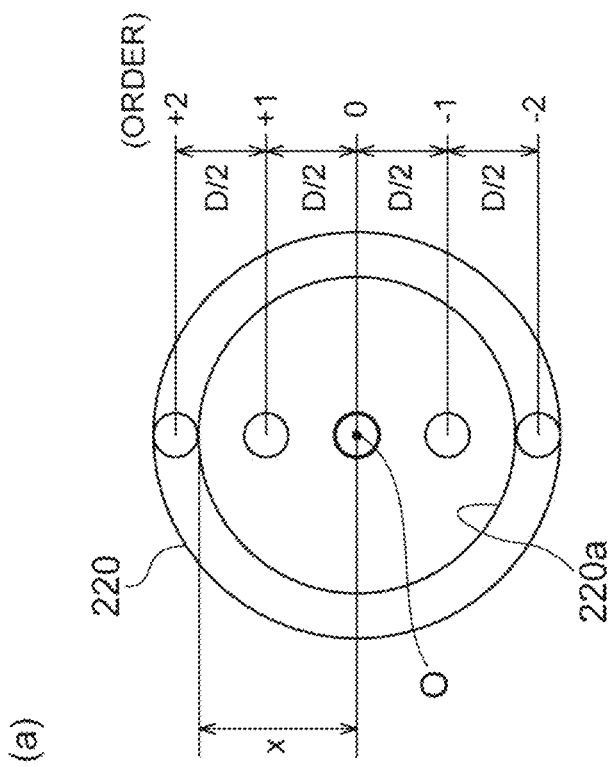

Further, the light blocking part 220 may be provided at a light entrance part of the converging optical system 204 so as to limit a lens field of view of the converging optical system 204. In a case in which a radius is X of the aperture 220a of the light blocking part 220 positioned at the light entrance part of the converging optical system 204 as illustrated in FIG. 16(a), and the distance is D between the first converging point P1 and the second converging point P2 when viewed from the direction orthogonal to the front face 3 of the object 1 as described above, when the reflective spatial light modulator 203 modulates the laser light L so that X/2<D/2<X is satisfied, the light blocking part 220 can block the ±2nd order light and higher order light (outer part than the center for the ±2nd order light). As illustrated in FIG. 16(b), when the reflective spatial light modulator 203 modulates the laser light L so that X/3<D/2<X is satisfied, the light blocking part 220 can block the ±3rd order light and higher order light (outer part than the center for the ±3rd order light).

As an example, in a case in which 2X=150 μm, when the distance D between the first converging point P1 and the second converging point P2 is determined so as to satisfy 37.5 μm<D/2<75 μm, the light blocking part 220 can block the ±2nd order light and higher order light (outer part than the center for the ±2nd order light). In a case in which 2X=150 μm, when the distance D between the first converging point P1 and the second converging point P2 is determined so as to satisfy 25 μm<D/2<75 μm, the light blocking part 220 can block the ±3rd order light and higher order light (outer part than the center for the ±3rd order light).

Here, a silicon wafer of a thickness of 300 μm, a crystal orientation of (100), a resistance value of 1 Ω·cm UP is prepared as the object 1, and irradiation of the laser light L is performed under the conditions shown in FIG. 11 and Table 3 above, to examine a relationship between the 3rd order light and presence of occurrence of the damages at the front face 3. In order to facilitate determination of presence of occurrence of the damages at the front face 3, a heat-sensitive film is formed on the front face 3 to perform an experiment.

Figure 17:
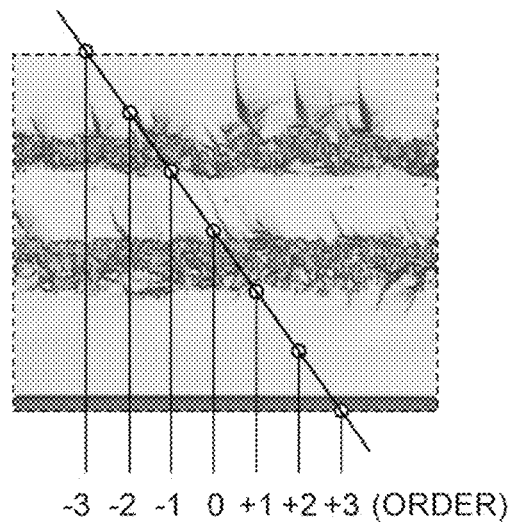
FIG. 17 is a diagram for explaining an experiment relating to the present invention.
Figure 17:
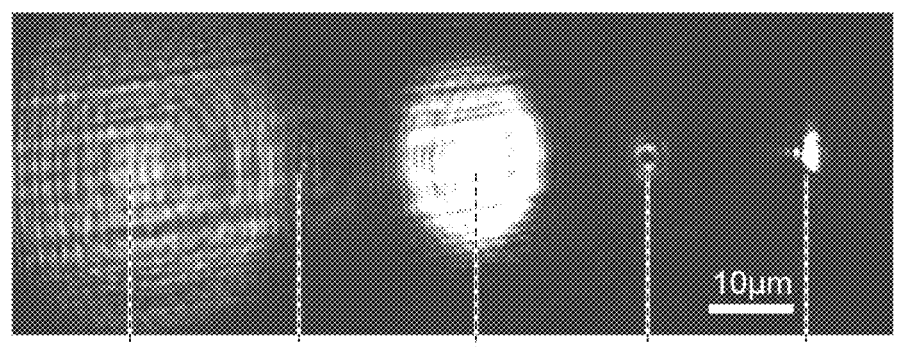
Figure 17:
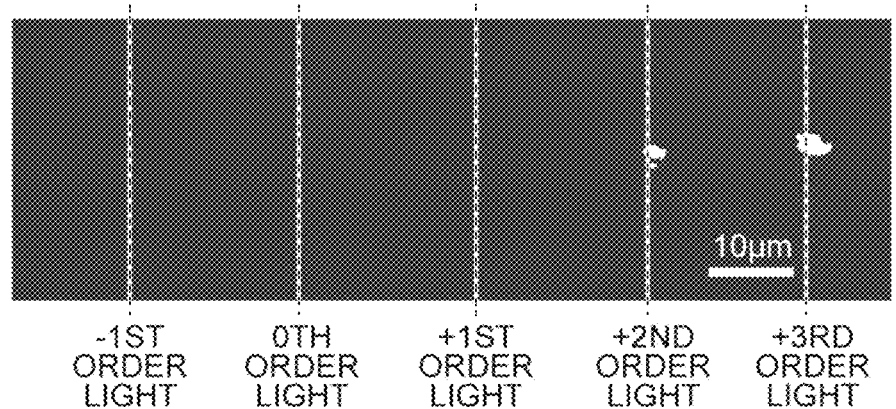
Figure 17:
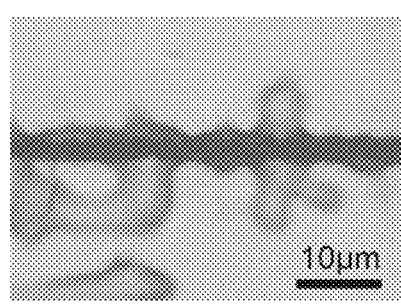

As a result of the experiment, it has been found that the damages occur at the front face 3 as the opposite side to the laser light L entrance side of the object 1 due to at least influence of the 3rd order light, as illustrated in FIG. 17(d). FIG. 17(a) is a diagram illustrating a positional relationship of the converging points of 0th order light and ±nth order light in the cut surface of the object 1 cut along the line 5. FIG. 17(b) is a photograph of states of the 0th order light and ±nth order light at the front face 3 observed from the front face 3 side when the modified region has not been formed. FIG. 17(c) is a photograph of the states of the 0th order light and ±nth order light at the front face 3 observed from the front face 3 side when the modified region has been formed. FIG. 17(d) is a photograph of the heat-sensitive film observed from the front face 3 side when the modified region has been formed.

Figure 18:
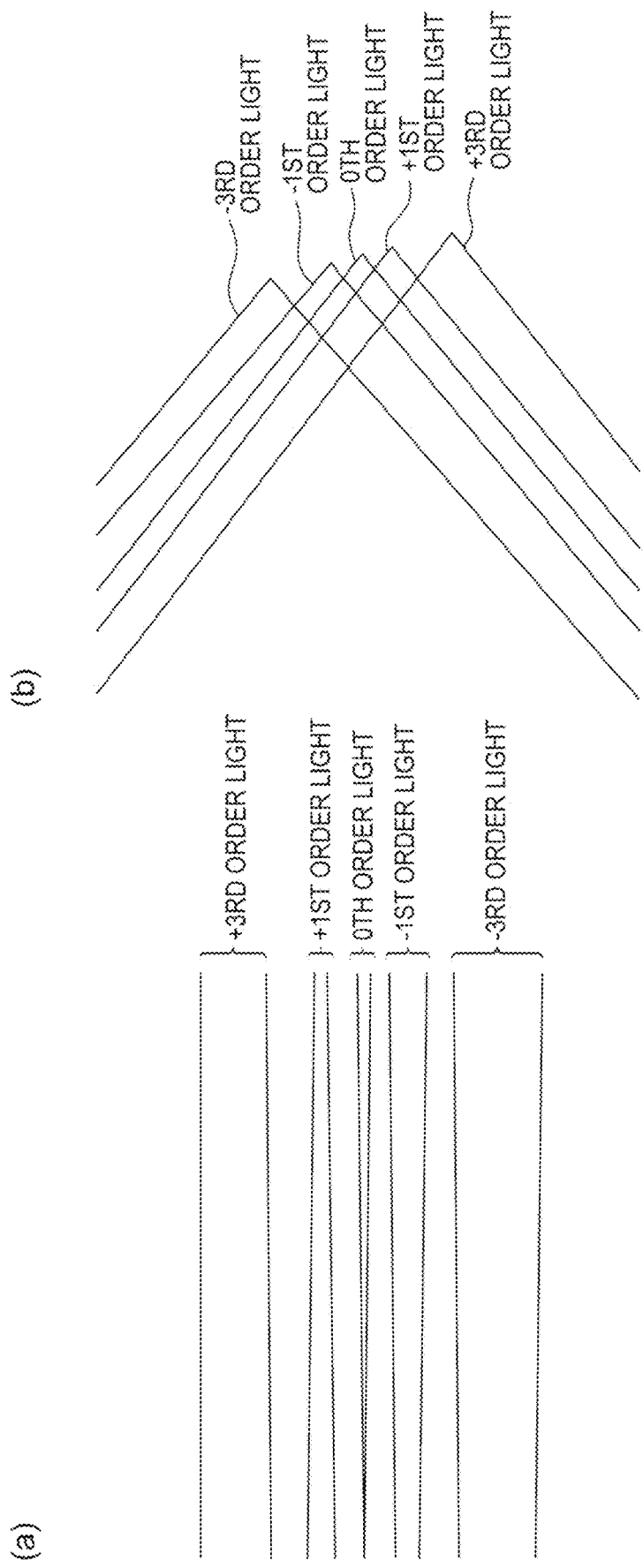
FIG. 18 is a diagram for explaining a comparative example of the present invention.
Figure 19:
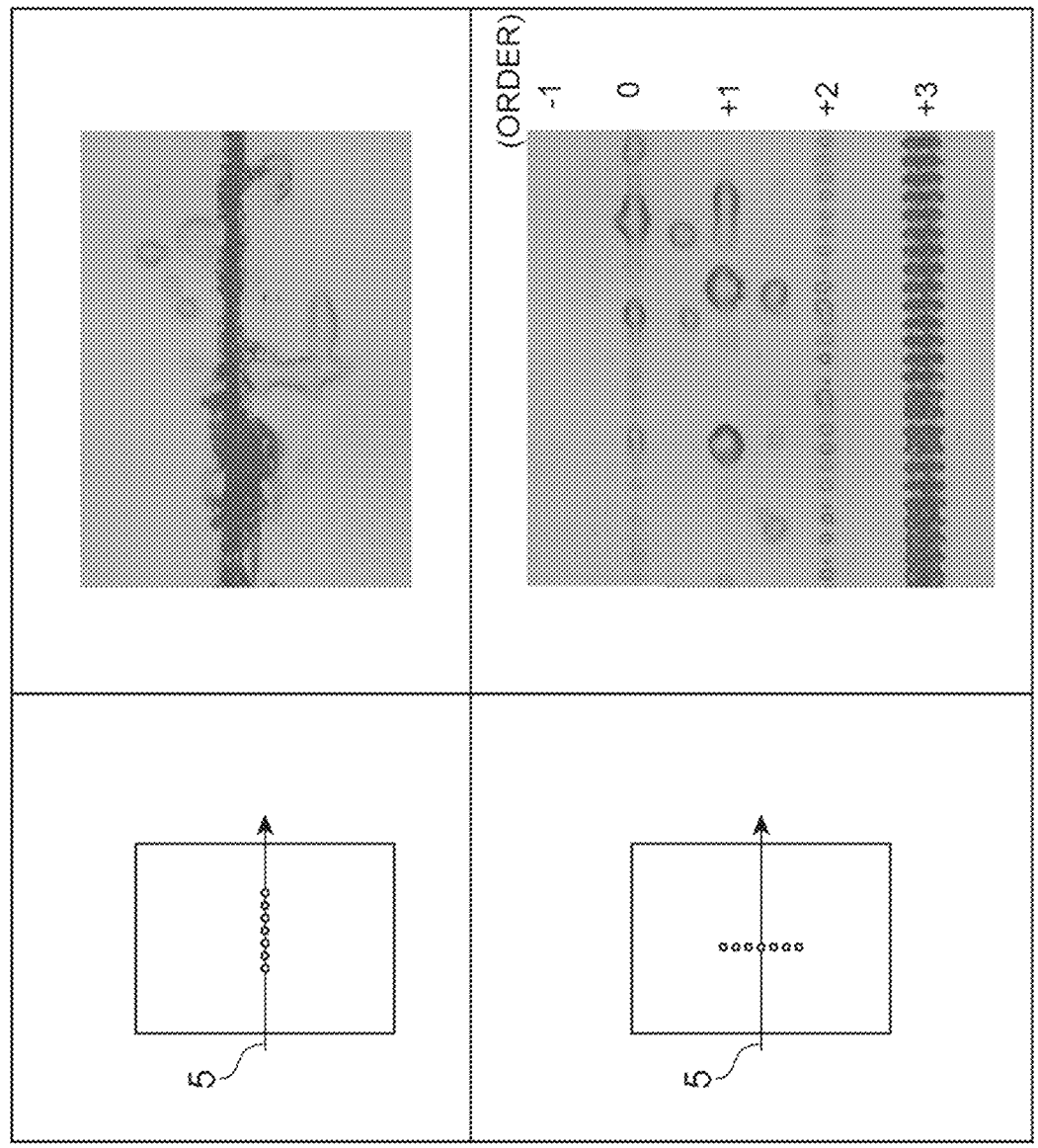
FIG. 19 is a diagram for explaining a result of a case of the comparative example of FIG. 18.

FIG. 18 is a diagram for explaining a comparative example of the present invention; (a) is a simulation diagram illustrating a state of the laser light L in the vicinity of the Fourier plane, and (b) is a simulation diagram illustrating a state of the laser light L in the vicinity of the converging point. In this way, it has been found that the most significant damage occurs at the front face 3 as the opposite side to the laser light L entrance side of the object 1 due to influence of the +3rd order light, as illustrated in FIG. 19, when the +3rd order light is not blocked. The upper part of FIG. 19 is a photograph of the heat-sensitive film observed from the front face 3 side when the laser light L is relatively moved in a direction parallel to a direction into which the converging points of the 0th order light and ±nth order light are caused to branch, and the lower part of FIG. 19 is a photograph of the heat-sensitive film observed from the front face 3 side when the laser light L is relatively moved in a direction orthogonal to the direction into which the converging points of the 0th order light and ±nth order light are caused to branch.

Figure 20:
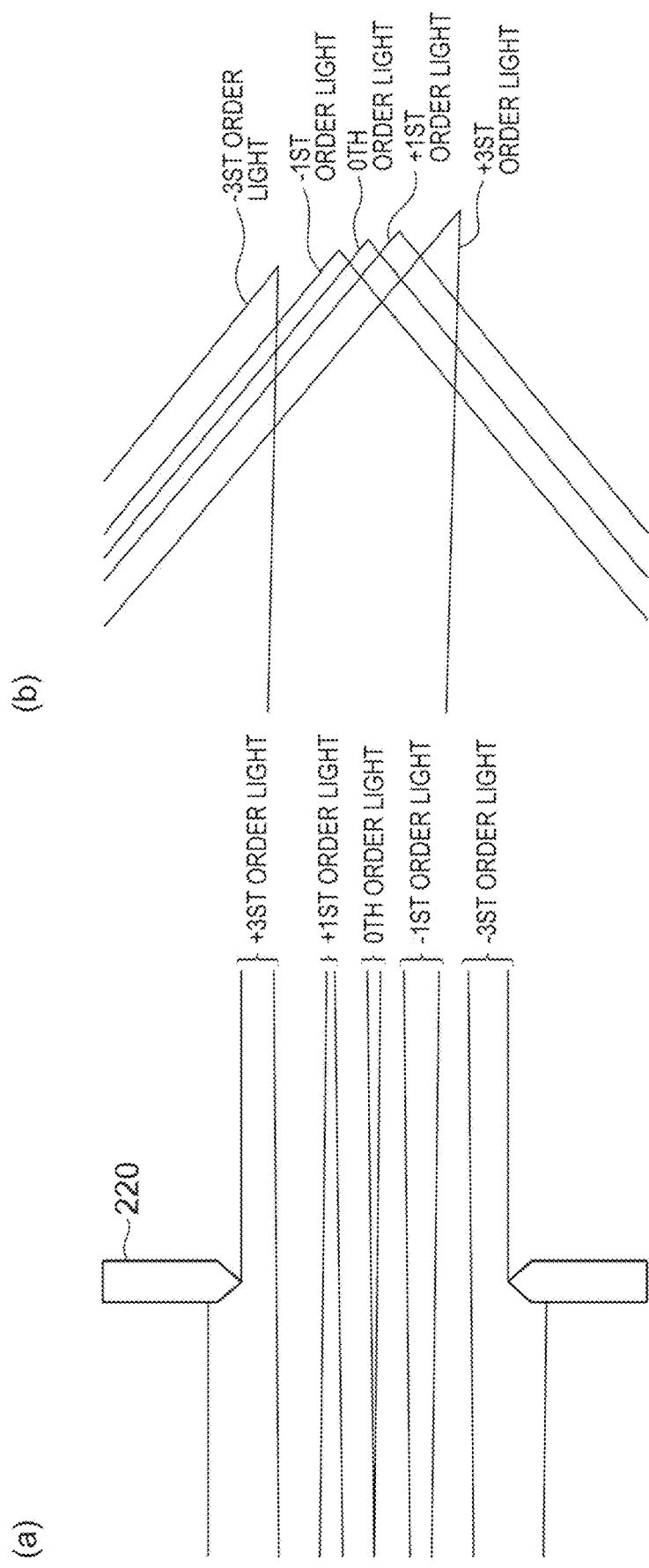
FIG. 20 is a diagram for explaining an example of the present invention.
Figure 21:
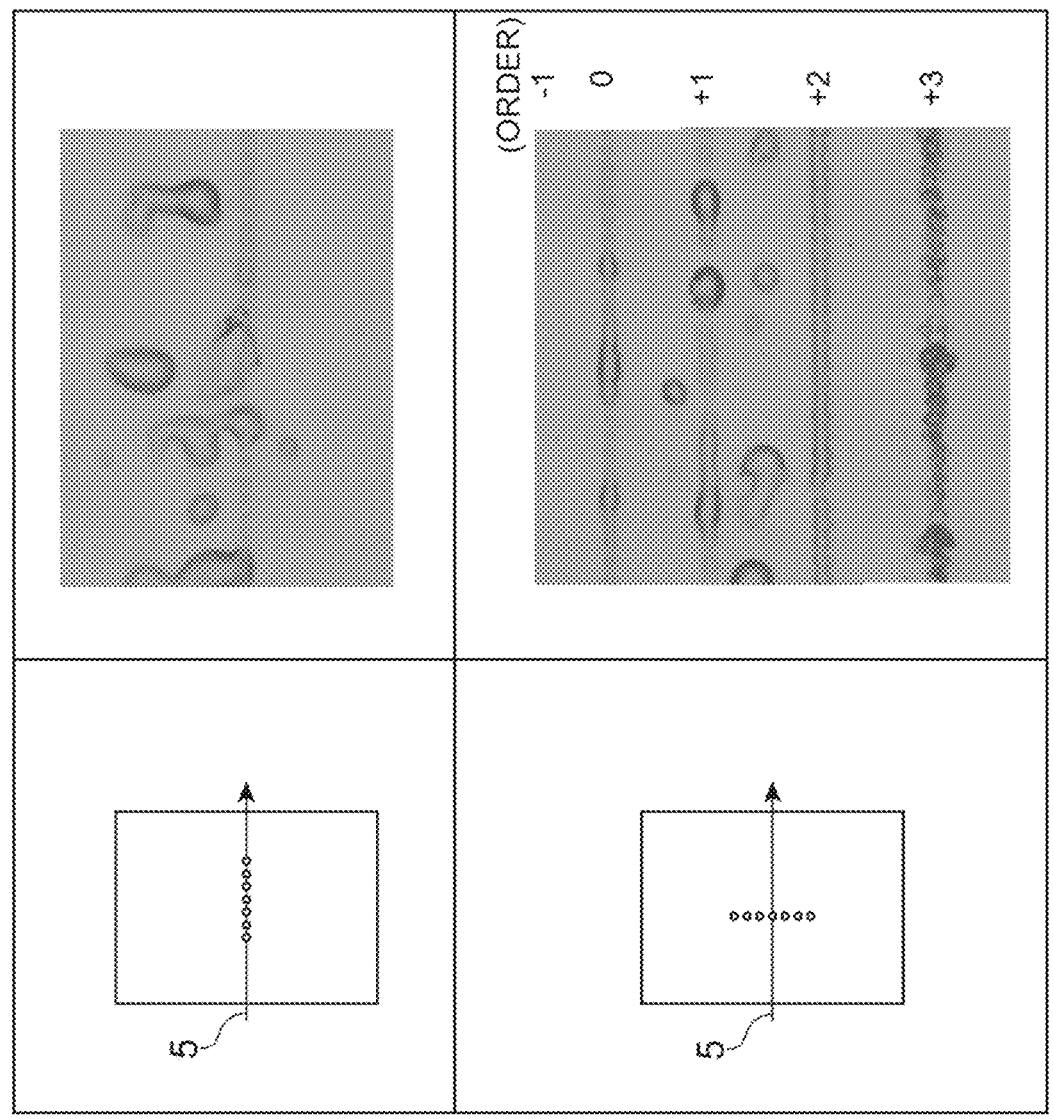
FIG. 21 is a diagram for explaining a result of a case of the example of FIG. 20.

FIG. 20 is a diagram for explaining an example of the present invention; (a) is a simulation diagram illustrating a state of the laser light L in the vicinity of the Fourier plane, and (b) is a simulation diagram illustrating a state of the laser light L in the vicinity of the converging point. In this way, it has been found that the damages are reduced that occur at the front face 3 of the object 1 due to influence of the +3rd order light, as illustrated in FIG. 21, when part of the +3rd order light is blocked with the light blocking part 220. The upper part of FIG. 21 is a photograph of the heat-sensitive film observed from the front face 3 side when the laser light L is relatively moved in the direction parallel to the direction into which the converging points of the 0th order light and ±nth order light are caused to branch, and the lower part of FIG. 21 is a photograph of the heat-sensitive film observed from the front face 3 side when the laser light L is relatively moved in the direction orthogonal to the direction into which the converging points of the 0th order light and ±nth order light are caused to branch.

Figure 22:
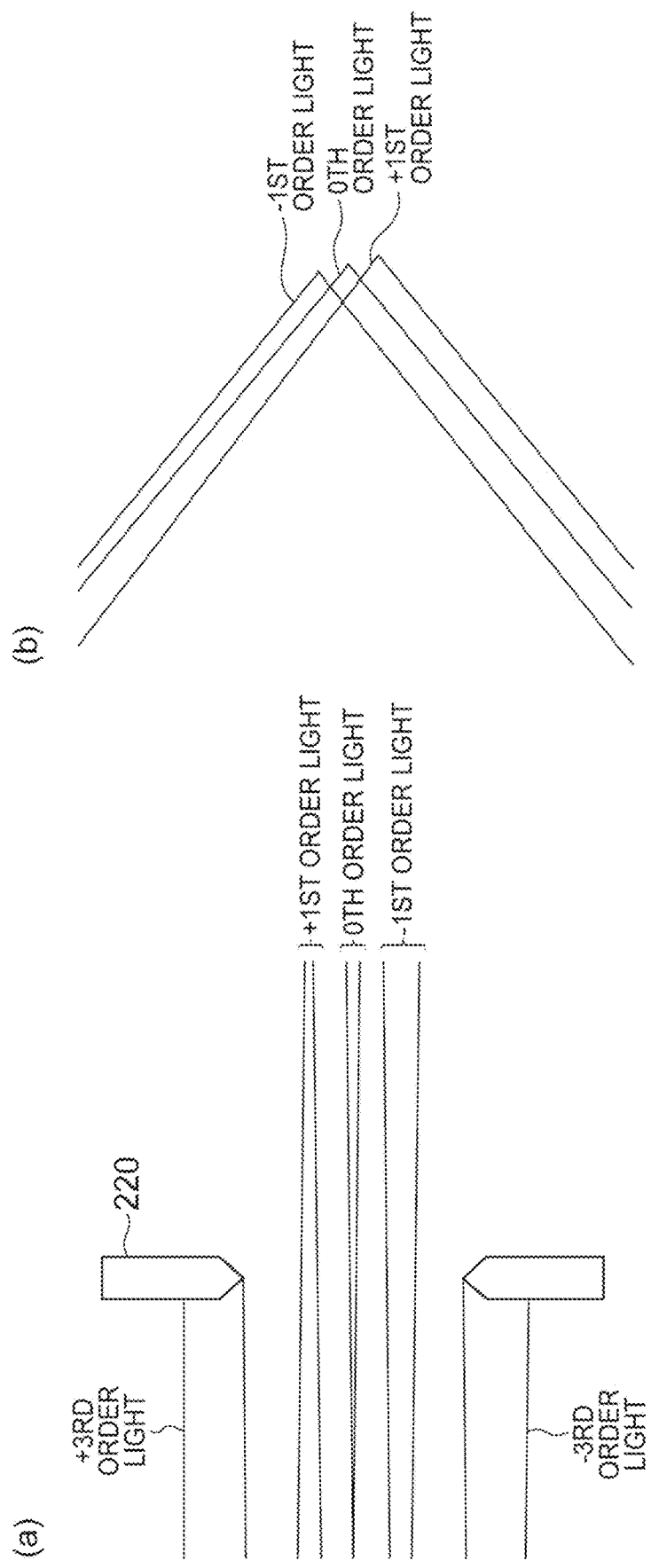
FIG. 22 is a diagram for explaining an example of the present invention.
Figure 23:
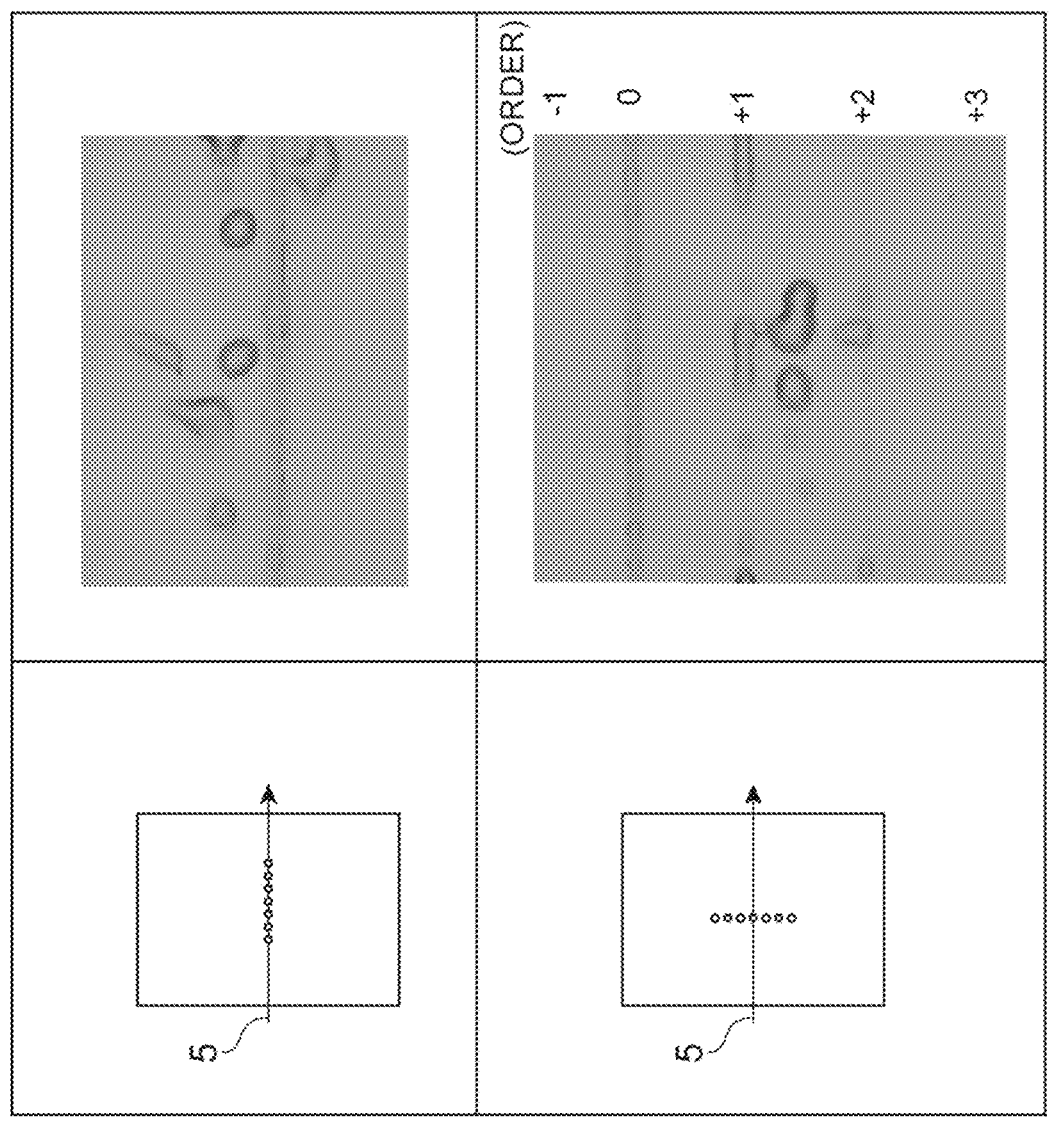
FIG. 23 is a diagram for explaining a result of a case of the example of FIG. 22.

FIG. 22 is a diagram for explaining an example of the present invention; (a) is a simulation diagram illustrating a state of the laser light L in the vicinity of the Fourier plane, and (b) is a simulation diagram illustrating a state of the laser light L in the vicinity of the converging point. In this way, it has been found that the damages substantially disappear that occur at the front face 3 of the object 1 due to influence of the +3rd order light, as illustrated in FIG. 23, when the +3rd order light is entirely blocked with the light blocking part 220. The upper part of FIG. 23 is a photograph of the heat-sensitive film observed from the front face 3 side when the laser light L is relatively moved in the direction parallel to the direction into which the converging points of the 0th order light and ±nth order light are caused to branch, and the lower part of FIG. 23 is a photograph of the heat-sensitive film observed from the front face 3 side when the laser light L is relatively moved in the direction orthogonal to the direction into which the converging points of the 0th order light and ±nth order light are caused to branch.

Figure 24:
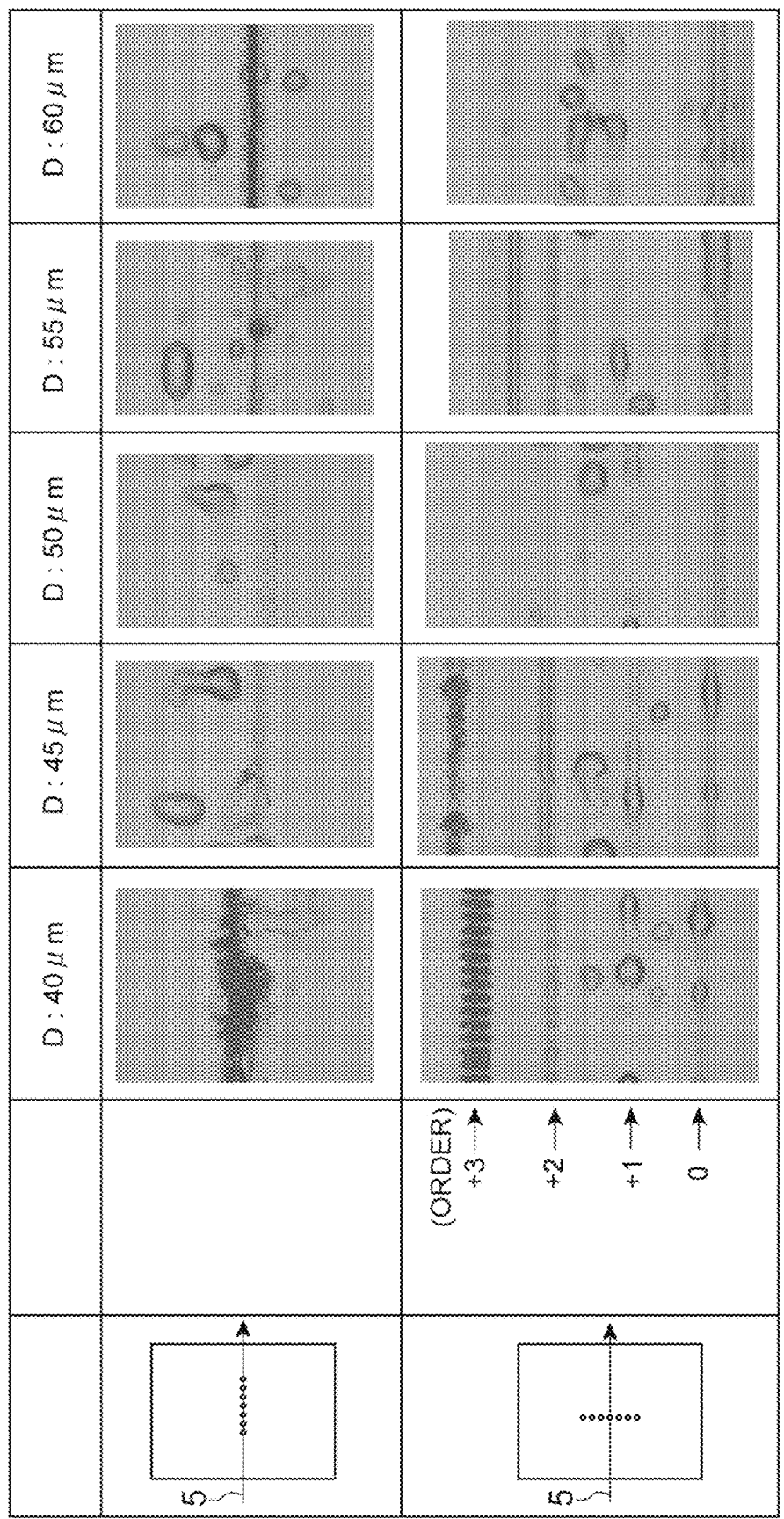
FIG. 24 is a diagram for explaining experimental results relating to the present invention.

FIG. 24 is a diagram for explaining experimental results relating to the present invention. In this case, the light blocking part 220 is provided at the light entrance part of the converging optical system 204 so as to limit the lens field of view of the converging optical system 204, and the lens field of view can block the +3rd order light when the distance D is 50 μm or more between the first converging point P1 and the second converging point P2. As it is apparent from the experimental results illustrated in FIG. 24, it has been found that the damages substantially disappear that occur at the front face 3 of the object 1 due to influence of the +3rd order light when the +3rd order light is blocked with the light blocking part 220. The upper part of FIG. 24 is a photograph of the heat-sensitive film observed from the front face 3 side when the laser light L is relatively moved in the direction parallel to the direction into which the converging points of the 0th order light and ±nth order light are caused to branch, and the lower part of FIG. 24 is a photograph of the heat-sensitive film observed from the front face 3 side when the laser light L is relatively moved in the direction orthogonal to the direction into which the converging points of the 0th order light and ±nth order light are caused to branch.

From the above, the laser processing method performed in the laser processing device 300 causes the laser light L to branch into the 0th order light and ±nth order light including the first processing light L1 and second processing light L2, modulates the laser light L so that the first processing light L1 is converged at the first converging point P1 and the second processing light L2 is converged at the second converging point P2, and forms the modified region 7 at each of a plurality of regions corresponding to each of the first converging point P1 and the second converging point P2 in the object 1.

At this time, in a case in which the radius is W1 of the first processing light L1 at the front face 3, the radius is W2 of the second processing light L2 at the front face 3, and the distance is D between the first converging point P1 and the second converging point P2 when viewed from the direction orthogonal to the front face 3, the laser light L is modulated so that $D > W1 + W2$ is satisfied. Alternatively, the laser light L is modulated so that the distance is from 40 μm to 80 μm between the first converging point P1 and the second converging point P2 when viewed from the direction orthogonal to the front face 3.

The light is blocked that is converged at the outside with respect to the first processing light L1 and second processing light L2 of the 0th order light and ±nth order light to be converged at the object 1. Alternatively, of the 0th order light and ±nth order light to be converged at the object 1, the light to be converged at the front face 3 side as the opposite side to the laser light L entrance side of the object with respect to the first processing light L1 and second processing light L2, and the light to be converged at the rear face 21 side as the laser light L entrance side of the object with respect to the first processing light L1 and second processing light L2, are blocked.

After the modified region 7 is formed within the object 1, an expand tape is stuck on the rear face 21 of the object 1, and the expand tape is expanded. This causes fractures extending in the thickness direction of the object 1 from the modified region 7 formed along the line 5 to reach the front face 3 and rear face 21 of the object 1, and the laser processing method cuts the object 1 along the line 5 for each of the functional devices 15a to obtain the plurality of chips.

As described above, the laser processing device 300, and the laser processing method performed in the laser processing device 300 block the light to be converged at the outside with respect to the first processing light L1 and second processing light L2 of the 0th order light and ±nth order light to be converged at the object 1. Alternatively, of the 0th order light and ±nth order light to be converged at the object 1., the light to be converged at the front face 3 side as the opposite side to the laser light L entrance side of the object with respect to the first processing light L1 and second processing light L2, and the light to be converged at the rear face 21 side as the laser light L entrance side of the object with respect to the first processing light L1 and second processing light L2, are blocked. These can prevent the light from converging at the vicinity of the rear face 21 and the vicinity of the front face 3 of the object 1. Therefore, when causing the laser light L to branch into a plurality of rays of processing light so as to form the modified region 7 with each of the rays of processing light, the damages can be inhibited from occurring at the front face 3 as the opposite side to the laser light L entrance side of the object 1, and at the rear face 21 as the laser light L entrance side of the object.

The first processing light L1 and second processing light L2 are selected from the 0th order light and ±1st order light of the 0th order light and ±nth order light to be converged at the object 1, and the light blocking part 220 blocks the ±2nd order light and ±3rd order light of the ±nth order light to be converged at the object 1. This can more reliably inhibit the damages from occurring at the front face 3 as the opposite side to the laser light L entrance side of the object 1, and at the rear face 21 as the laser light L entrance side of the object 1, while efficiently using the 0th order light and ±1st order light having relatively large energy as the first processing light L1 and second processing light L2. In particular, blocking the +3rd order light having relatively large energy is important for inhibiting the damages from occurring at the front face 3 as the opposite side to the laser light L entrance side of the object 1.

The light blocking part 220 has the aperture 220a allowing the first processing light L 1 and second processing light L2 to pass therethrough. This makes it possible to achieve with a simple structure the light blocking part 220 allowing at least the first processing light L1 and second processing light L2 to pass therethrough and blocking predetermined light other than the first processing light L1 and the second processing light L2.

The light blocking part 220 is provided on the Fourier plane between the first lens 241a and the second lens 241b. This makes it possible to reliably block the predetermined light other than the first processing light L1 and the second processing light L2. Even when the light blocking part 220 is provided at the light entrance part of the converging optical system 204, it is possible to reliably block the predetermined light other than the first processing light L1 and the second processing light L2. The reflective spatial light modulator 203 may modulate the laser light L so that at least part of the light to be blocked passes through the outside of the aperture 220a. This makes it possible to more reliably block the predetermined light other than the first processing light L1 and the second processing light L2.

The front face 3 as the opposite side to the laser light L entrance side of the object 1 is provided with the plurality of functional devices 15a two-dimensionally arranged, and the metal pattern 16 arranged at the street region 17 between the functional devices 15a adjacent to each other, and the line 5 is set so as to pass through the street region 17 between the functional devices 15a adjacent to each other when viewed from the direction orthogonal to the front face 3. When the metal pattern 16 is arranged at the street region 17 between the functional devices 15a adjacent to each other at the front face 3 as the opposite side to the laser light L entrance side of the object 1, the metal pattern 16 absorbs the leakage light, and the damages easily occur at the front face 3. However, even in such a case, the damages can be inhibited from occurring at the front face 3 as the opposite side to the laser light L entrance side of the object 1. In particular, when the interlayer insulating layer (for example, Low-k film) is formed over the entire front face 11a of the substrate 11, it is effective since peeling of the interlayer insulating layer and the like can be inhibited.

In a case in which the radius is W1 of the first processing light L1 at the front face 3, the radius is W2 of the second processing light L2 at the front face 3, and the distance is D between the first converging point P1 and the second converging point P2 when viewed from the direction orthogonal to the front face 3, the laser light L is modulated so that D>W1+W2 is satisfied. This prevents the leakage light of the first processing light L1 and leakage light of the second processing light L2 reaching the front face 3 of the object 1 from interfering with and enhancing each other at the front face 3. Therefore, when causing the laser light L to branch into the plurality of rays of processing light so as to form the modified region 7 with each of the rays of processing light, the damages can be inhibited from occurring at the front face 3 as the opposite side to the laser light L entrance side of the object 1.

In a case in which the distance is d between the pixels adjacent to each other in the reflective spatial light modulator 203, the magnification is m of the 4f optical system 241, the focal length is f of the converging optical system 204, and the wavelength is $\lambda$ of the laser light L, the reflective spatial light modulator 203 modulates the laser light L so that $D<2\times f\times \tan[a\sin\{\lambda/(d\times 4\times m)\}]$ is satisfied. In order to increase the distance D between the first converging point P1 and the second converging point P2 when viewed from the direction orthogonal to the front face 3, it is necessary to decrease the number of grating pixels in the modulation pattern of the reflective spatial light modulator 203. However, when the number of grating pixels is excessively decreased, there is a possibility that the leakage light is increased due to the increase of components to which wavefront control cannot be performed in the laser light L. Modulating the laser light L so that $D<2\times f\times \tan[a\sin\{\lambda/(d\times 4\times m)\}]$ is satisfied, inhibits the leakage light from being increased due to the increase of the components to which the wavefront control cannot be performed in the laser light L, and inhibits the damages from occurring at the front face 3 as the opposite side to the laser light L entrance side of the object 1.

The embodiment of the present invention has been described above; however, the present invention is not limited to the above-mentioned embodiment. For example, the structure and material of the object 1 are not limited to those mentioned above. As an example, the substrate 11 may be a semiconductor substrate other than the silicon substrate, sapphire substrate, SiC substrate, glass substrate (tempered glass substrate), transparent insulation substrate, or the like.

The converging points of the 0th order light and ±nth order light may have a positional relationship in which the points are positioned at the front face 3 side as the opposite side to the laser light L entrance side of the object 1 and positioned at the anterior side in the relative moving direction of the laser light L along the line 5, as the value indicating the order decreases in the object 1. The laser light L may be caused to enter from the front face 3 side of the object 1. In this case, the rear face 21 is the first surface as the opposite side to the laser light L entrance side of the object 1, and the front face 3 is the second surface as the laser light L entrance side of the object 1.

The light blocking part 220 may be the one having a member blocking the ±nth order light, and a member blocking the −nth order light, and allowing the first processing light L1 and the second processing light L2 to pass therethrough in a region between the members facing each other. The light blocking part 220 may selectively block the ±2nd order light and higher order light, for example, of the ±nth order light to be converged at the object 1, block only the light to be converged at the front face 3 side as the opposite side to the laser light L entrance side of the object with respect to the first processing light L1 and second processing light L2, or block only the +3rd order light.

INDUSTRIAL APPLICABILITY

According to the present invention, the laser processing device and laser processing method can be provided capable of inhibiting the damages from occurring at the front face as the opposite side to the laser light entrance side of the object when causing the laser light to branch into the plurality of rays of processing light so as to form the modified region with each of the rays of processing light.

REFERENCE SIGNS LIST 1 object to be processed
3 front face (first surface)
5 line to cut
7 modified region
15a functional device
16 metal pattern
17 street region (region)
21 rear face (second surface)
202 laser light source
203 reflective spatial light modulator (spatial light modulator)
204 converging optical system
220 light blocking part
220a aperture
241 4f optical system (adjustment optical system)
241a first lens (first optical element)
241b second lens (second optical element)
300 laser processing device
L laser light
L1 first processing light
L2 second processing light
P1 first converging point
P2 second converging point

The invention claimed is:

1. A laser processing device for converging laser light at an object to be processed so as to form a modified region within the object along a line to cut, the laser processing device comprising:
a laser light source emitting the laser light;
a converging optical system converging the laser light emitted from the laser light source at the object;

a spatial light modulator modulating the laser light emitted from the laser light source such that the laser light is caused to branch into 0th order light and ±nth order light (n is a natural number) including at least first processing light and second processing light, and the first processing light is converged at a first converging point and the second processing light is converged at a second converging point by the converging optical system; and a light blocking part having an aperture, the light blocking part blocking a portion of the laser light to be converged at an outside with respect to the first processing light and the second processing light of the 0th order light and the ±nth order light to be converged at the object, wherein converging points of the 0th order light and the ±nth order light have a positional relationship in which the points are positioned at a first surface side as an opposite side to a laser light entrance side of the object and positioned at an anterior side in a moving direction of the laser light along the line, relative to a value indicating the respective order of the 0th order light and the ±nth order light, in the object.

2. The laser processing device according to claim 1, wherein the first processing light and the second processing light are selected from the 0th order light and ±1st order light of the 0th order light and the ±nth order light to be converged at the object, and the light blocking part blocks +3rd order light of the ±nth order light to be converged at the object.

3. The laser processing device according to claim 2, wherein the light blocking part further blocks ±2nd order light and −3rd order light of the ±nth order light to be converged at the object.

4. The laser processing device according to claim 1, wherein the aperture allows the first processing light and the second processing light to pass therethrough.

5. The laser processing device according to claim 4, further comprising an adjustment optical system having a first optical element and a second optical element each of which functions as a lens, wherein the first optical element and the second optical element are arranged such that a distance of an optical path between the spatial light modulator and the first optical element equals a first focal length of the first optical element, a distance of an optical path between the converging optical system and the second optical element equals a second focal length of the second optical element, a distance of an optical path between the first optical element and the second optical element equals a sum of the first focal length and the second focal length, and the first optical element and the second optical element constitute a double-telecentric optical system, and the light blocking part is provided on a Fourier plane between the first optical element and the second optical element.

6. The laser processing device according to claim 4, wherein the light blocking part is provided at a light entrance part of the converging optical system.

7. The laser processing device according to claim 4, wherein the spatial light modulator modulates the laser light such that at least part of light to be blocked passes through an outside of the aperture.

8. The laser processing device according to claim 1, wherein the first surface is provided with a plurality of functional devices two-dimensionally arranged, and a metal pattern arranged at a region between the functional devices adjacent to each other, and the line is set so as to pass through the region between the functional devices adjacent to each other when viewed from a direction orthogonal to the first surface.

9. A laser processing device for converging laser light at an object to be processed so as to form a modified region within the object along a line to cut, the laser processing device comprising:

a laser light source emitting the laser light;

a converging optical system converging the laser light emitted from the laser light source at the object;

a spatial light modulator modulating the laser light emitted from the laser light source such that the laser light is caused to branch into 0th order light and ±nth order light (n is a natural number) including at least first processing light and second processing light, and the first processing light is converged at a first converging point and the second processing light is converged at a second converging point by the converging optical system; and a light blocking part having an aperture, the light blocking part blocking a portion of the laser light to be converged at a first surface side as an opposite side to the laser light entrance side of the object with respect to the first processing light and the second processing light of the 0th order light and the ±nth order light to be converged at the object, wherein converging points of the 0th order light and the ±nth order light have a positional relationship in which the points are positioned at the first surface side as the opposite side to a laser light entrance side of the object and positioned at an anterior side in a moving direction of the laser light along the line, relative to a value indicating the respective order of the 0th order light and the ±nth order light, in the object.

10. The laser processing device according to claim 9, wherein the light blocking part further blocks light to be converged at a second surface side as the laser light entrance side of the object with respect to the first processing light and the second processing light of the 0th order light and the ±nth order light to be converged at the object.

11. The laser processing device according to claim 9, wherein the first processing light and the second processing light are selected from the 0th order light and ±1st order light of the 0th order light and the ±nth order light to be converged at the object, and the light blocking part blocks +3rd order light of the ±nth order light to be converged at the object.

12. The laser processing device according 9, wherein the aperture allows the first processing light and the second processing light to pass therethrough.

13. The laser processing device according to claim 12, further comprising an adjustment optical system having a first optical element and a second optical element each of which functions as a lens, wherein the first optical element and the second optical element are arranged such that a distance of an optical path between the spatial light modulator and the first optical element equals a first focal length of the first optical element, a distance of an optical path between the converging optical system and the second optical element equals a second focal length of the second optical element, a distance of an optical path between the first optical element and the second optical element equals a sum of the first focal length and the second focal length, and the first optical element and the second optical element constitute a double-telecentric optical system, and the light blocking part is provided on a Fourier plane between the first optical element and the second optical element.

14. The laser processing device according to claim 12, wherein the light blocking part is provided at a light entrance part of the converging optical system.

15. The laser processing device according to claim 12, wherein the spatial light modulator modulates the laser light such that at least part of light to be blocked passes through an outside of the aperture.

16. The laser processing device according to claim 9, wherein the first surface is provided with a plurality of functional devices two-dimensionally arranged, and a metal pattern arranged at a region between the functional devices adjacent to each other, and the line is set so as to pass through the region between the functional devices adjacent to each other when viewed from a direction orthogonal to the first surface.

17. A laser processing method for converging laser light at an object to be processed so as to form a modified region within the object along a line to cut, the laser processing method comprising modulating the laser light such that the laser light is caused to branch into 0th order light and ±nth order light (n is a natural number) including at least first processing light and second processing light, and the first processing light is converged at a first converging point and the second processing light is converged at a second converging point, blocking light to be converged at an outside with respect to the first processing light and the second processing light of the 0th order light and the ±nth order light to be converged at the object, and forming the modified region at each of a plurality of regions corresponding to each of the first converging point and the second converging point in the object, wherein converging points of the 0th order light and the ±nth order light have a positional relationship in which the points are positioned at a first surface side as an opposite side to a laser light entrance side of the object and positioned at an anterior side in a moving direction of the laser light along the line, relative to a value indicating the respective order of the 0th order light and the ±nth order light, in the object.

18. A laser processing method for converging laser light at an object to be processed so as to form a modified region within the object along a line to cut, the laser processing method comprising modulating the laser light such that the laser light is caused to branch into 0th order light and ±nth order light (n is a natural number) including at least first processing light and second processing light, and the first processing light is converged at a first converging point and the second processing light is converged at a second converging point, blocking light to be converged at a first surface side as an opposite side to the laser light entrance side of the object with respect to the first processing light and the second processing light of the 0th order light and the ±nth order light to be converged at the object, and forming the modified region at each of a plurality of regions corresponding to each of the first converging point and the second converging point in the object, wherein converging points of the 0th order light and the ±nth order light have a positional relationship in which the points are positioned at the first surface side as the opposite side to a laser light entrance side of the object and positioned at an anterior side in a moving direction of the laser light along the line, relative to a value indicating the respective order of the 0order light and the ±nth order light, in the object.

* * * * *